United States Patent
Lu et al.

(10) Patent No.: US 11,751,255 B2
(45) Date of Patent: *Sep. 5, 2023

(54) DATA TRANSMISSION METHOD IN A WIRELESS COMMUNICATION NETWORK

(71) Applicant: XI'AN ZHONGXING NEW SOFTWARE CO., LTD., Shaanxi (CN)

(72) Inventors: Ting Lu, Shenzhen (CN); Bo Dai, Shenzhen (CN); Xiubin Sha, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,180

(22) Filed: May 6, 2022

(65) Prior Publication Data

US 2022/0264657 A1 Aug. 18, 2022

Related U.S. Application Data

(63) Continuation of application No. 16/638,311, filed as application No. PCT/CN2018/100247 on Aug. 13, 2018, now Pat. No. 11,357,054.

(30) Foreign Application Priority Data

Aug. 11, 2017 (CN) .......................... 201710687283.5

(51) Int. Cl.
*H04B 7/216* (2006.01)
*H04W 74/08* (2009.01)
*H04W 72/23* (2023.01)

(52) U.S. Cl.
CPC ....... *H04W 74/0833* (2013.01); *H04W 72/23* (2023.01)

(58) Field of Classification Search
CPC ............. H04W 74/0833; H04W 72/04; H04W 72/042; H04W 74/08; H04W 74/085
See application file for complete search history.

(56) References Cited

U.S. PATENT DOCUMENTS

| | | |
|---|---|---|
| 2012/0307716 A1 | 12/2012 | Zhao |
| 2014/0043990 A1 | 2/2014 | Lin |

(Continued)

FOREIGN PATENT DOCUMENTS

| | | |
|---|---|---|
| CN | 101873707 A | 10/2010 |
| CN | 101895986 A | 11/2010 |

(Continued)

OTHER PUBLICATIONS

"3rd Generation Partnership Project, 3GPP TS 38.321, Medium Access Control (MAC) protocol specification", URL: http://www.3gpp.org, 2017.

(Continued)

*Primary Examiner* — Abdelnabi O Musa
(74) *Attorney, Agent, or Firm* — CANTOR COLBURN LLP

(57) ABSTRACT

Provided are a data transmission method, apparatus and computer readable storage medium. The method includes: sending, by a terminal, a random access preamble to a base station, and receiving, by the terminal, a random access response sent by the base station; and sending, by the terminal, a first request message carrying uplink data to the base station; wherein the sending, by the terminal, the random access preamble to the base station comprises: in response to determining that the terminal satisfies a first preset condition, sending, by the terminal, the random access preamble for requesting an uplink data transmission resource to the base station; and wherein the method further comprising one of: failing to receive, by the terminal, a second response message returned by the base station;

(Continued)

receiving, by the terminal, the second response message carrying an uplink data failure indication or an uplink data retransmission indication returned by the base station; or in response to determining that the terminal fails to receive the random access response returned by the base station, determining, by the terminal, a random access failure and reinitiating, by the terminal, random access.

21 Claims, 10 Drawing Sheets

(56) References Cited

U.S. PATENT DOCUMENTS

| | | | |
|---|---|---|---|
| 2014/0233538 | A1 | 8/2014 | Zhang |
| 2015/0045038 | A1 | 2/2015 | Gao |
| 2015/0351031 | A1* | 12/2015 | Wentink ................ H04W 74/06 370/311 |
| 2016/0135247 | A1 | 5/2016 | Ozturk |
| 2017/0208546 | A1* | 7/2017 | Park ....................... H04L 5/0055 |
| 2017/0273113 | A1* | 9/2017 | Tirronen ............. H04W 72/042 |
| 2019/0037447 | A1* | 1/2019 | Lee ........................ H04W 28/18 |
| 2020/0037368 | A1* | 1/2020 | Höglund ........... H04W 72/1294 |
| 2020/0187245 | A1* | 6/2020 | Fujishiro ........... H04W 72/0413 |
| 2022/0264657 | A1* | 8/2022 | Lu ..................... H04W 74/0833 |

FOREIGN PATENT DOCUMENTS

| | | |
|---|---|---|
| CN | 101932117 A | 12/2010 |
| CN | 101953185 A | 1/2011 |
| CN | 106465401 A | 2/2017 |

OTHER PUBLICATIONS

Chinese Office Action for corresponding application 201710687283.5; Report dated May 25, 2021.
Chinese Search Report for corresponding application 201710687283.5; Report dated May 25, 2021.
Ericsson, "NB-IoT-Random Access", 3GPP TSG RAN WG1 Meeting #84, St Julian's, Malta Feb. 15-19, 2016, R1-160278.
Ericsson, "On-demand system information procedure", 3GPP TSG-RAN WG2 NR-AH #2, Qingdao, P R. of China, Jun. 27-29, 2017, R2-1706499.
European Search Report for corresponding application EP18845080; Report dated Apr. 15, 2021.
International Search Report for corresponding application PCT/CN2018/100247 filed Aug. 13, 2018; dated Oct. 26, 2018.
LG Electronics, "Data Transmission during random access procedure in NB-IoT", 3GPP TSG RAN WG1 Meeting #89, Hangzhou China, May 15-19, 2017, R1-1707579.
Qualcomm Incorporated, "Early Data Transmission", 3GPP TSG-RAN WG1, meeting #89, Hangzhou, China May 15-19, 2017, R1-1708810.

* cited by examiner

DATA TRANSMISSION METHOD IN A WIRELESS COMMUNICATION NETWORK

CROSS-REFERENCE TO RELATED APPLICATIONS

This application is a continuation of U.S. patent application Ser. No. 16/638,311, which was filed on Feb. 11, 2020 as the national stage of International Patent Application No. PCT/CN2018/100247 filed on Aug. 13, 2018, which claimed priority to Chinese Patent Application No. 201710687283.5 filed on Aug. 11, 2017, the disclosures of all of which are incorporated herein by reference in their entireties.

TECHNICAL FIELD

The present application relates to communications and, for example, to a data transmission method and apparatus, and a computer readable storage medium.

BACKGROUND

In a machine to machine (M2M) communication system, energy saving of a user equipment (UE) is crucial. In the related art, when the UE is in an RRC_IDLE state and data to be sent comes, the UE first triggers a random access procedure to setup or resume a radio resource control (RRC) connection with a network, and the UE may send the data to the base station along with an RRC-connection setup complete message or an RRC-resume complete message at the earliest. Then, the UE will remain in an RRC_CONNECTED state for a period of time, waiting for the base station to release the UE. When the UE is in the RRC_CONNECTED state and has data to send, the UE may need to initiate a random access first since losing time synchronization or having no uplink resource, and send the data to the base station after the random access process is completed.

SUMMARY

The following is a summary of the subject matter described herein in detail. This summary is not intended to limit the scope of the claims.

An embodiment of the present application provides a data transmission method and apparatus, and a computer readable storage medium.

An embodiment of the present application provides a data transmission method. The method includes sending, by a terminal, a random access preamble to a base station, and receiving a random access response sent by the base station; and sending, by a terminal, a first request message carrying uplink data to the base station.

An embodiment of the present application provides a data transmission apparatus, which includes a memory and a processor, where the memory stores a program, and the data transmission method described above is performed when the program is read and executed by the processor.

An embodiment of the present application provides a computer-readable storage medium storing at least one program, where the at least one program is executable by at least one processor, to perform the data transmission method described above.

An embodiment of the present application provides a data transmission method. The method includes receiving, by a base station, a random access prefix sent by a terminal, and sending a random access response to the terminal; and receiving, by the base station, a first request message carrying uplink data sent by the terminal.

In an embodiment, the first S1 interface message is one of: an initial user equipment (UE) message, a UE context resume request message, an uplink non-access stratum (NAS) transport message, a path switch request message or a newly-defined S1 interface message;

the second S1 interface message is one of: a connection setup indication message, a UE context resume response message, a downlink NAS transport message, a path switch request acknowledgement message and a newly-defined S1 interface message.

An embodiment of the present application provides a data transmission apparatus, the apparatus includes a memory and a processor, where the memory stores a program, and the data transmission method described above is performed when the program is read and executed by the processor.

An embodiment of the present application provides a computer-readable storage medium storing at least one program, where the at least one program is executable by at least one processor, to perform the data transmission method described above.

An embodiment of the present application provides a data transmission method, the method includes sending a first request message to a base station in a random access process in a case where the terminal is in an idle state, receiving a second response message sent by the base station, and acquiring downlink data in the second response message.

An embodiment of the present application provides a data transmission apparatus, which includes a memory and a processor, where the memory stores a program which, when read and executed by the processor, causes the processor to:

send a first request message to a base station in a random access process in a case where the terminal is in an idle state, receive a second response message sent by the base station, and acquire downlink data in the second response message.

An embodiment of the present application provides a computer-readable storage medium, which stores at least one program, where at least one processor is capable of executing the at least one program to implement: sending a first request message to a base station in a random access process in a case where the terminal is in an idle state, receiving a second response message sent by the base station, and acquiring downlink data in the second response message.

An embodiment of the present application provides a data transmission method, the method includes in a process of performing a random access in a case where a terminal is in an idle state, receiving, by a base station, a first request message sent by the terminal, in response to determining that the base station has downlink data required to be sent to the terminal, carrying, by the base station, the downlink data at the time of sending the second response message to the terminal.

An embodiment of the present application provides a data transmission apparatus. The apparatus includes a memory and a processor, where the memory stores a program which, when read and executed by the processor, performs the data transmission method.

An embodiment of the present application provides a computer-readable storage medium storing at least one program, where the at least one program is executable by at least one processor to perform the data transmission method described above.

An embodiment of the present application provides data transmission method. The method includes in a process of performing a random access in a case where a terminal is in an idle state, sending, by a network side, a second S1 interface message to a base station after receiving a first S1 interface message sent by the base station, where the second S1 interface message carries downlink data required to be sent to the terminal.

An embodiment of the present application provides data transmission apparatus. The apparatus includes a memory and a processor, where the memory stores a program, and the data transmission method described above is performed when the program is read and executed by the processor.

An embodiment of the present application provides a computer-readable storage medium storing at least one program, where the at least one program is executable by at least one processor, to perform the data transmission method described above.

An embodiment of the present application provides data transmission method. The method includes: in a case where a terminal is in a connected state, receiving, by the terminal, a physical downlink control channel command sent by a base station, acquiring an non-competitive resource allocated to the terminal by the base station from the physical downlink control channel command, initiating a random access by using a random access prefix corresponding to the non-competitive resource; and receiving, by the terminal, a random access response sent by the base station, and in response to determining that the random access response carries indication information for simultaneously sending downlink data, receiving, by the terminal, the downlink data.

An embodiment of the present application provides a data transmission apparatus, which includes a memory and a processor, where the memory stores a program which, when read and executed by the processor, causes the processor to:

in a case where a terminal is in a connected state, receive, by the terminal, a physical downlink control channel command sent by a base station, acquire an non-competitive resource allocated to the terminal by the base station from the physical downlink control channel command, initiate a random access by using a random access prefix corresponding to the non-competitive resource; and receive, by the terminal, a random access response sent by the base station, and in response to determining that the random access response carries indication information for simultaneously sending downlink data, receive the downlink data.

An embodiment of the present application provides a computer-readable storage medium, which stores at least one program, where at least one processor is capable of executing the at least one program to implement:

in a case where a terminal is in a connected state, receiving, by the terminal, a physical downlink control channel command sent by a base station, acquiring an non-competitive resource allocated to the terminal by the base station from the physical downlink control channel command, initiating a random access by using a random access prefix corresponding to the non-competitive resource;

receiving a random access response sent by the base station, and in response to determining that the random access response carries indication information for simultaneously sending downlink data, receiving the downlink data.

An embodiment of the present application provides a data transmission method, the method includes in a case where a terminal is in a connected state, sending, by a base station, a physical downlink control channel command to the terminal, the physical downlink control channel command carries a non-competitive resource allocated by the base station to the terminal; and after receiving a random access initiated by the terminal using a random access prefix corresponding to the non-competing resource, sending, by the base station, a random access response to the terminal, and the random access response carries indication information for simultaneously sending downlink data, and sending the downlink data simultaneously.

An embodiment of the present application provides a data transmission apparatus, which includes a memory and a processor, where the memory stores a program which, when read and executed by the processor, causes the processor to:

in a case where a terminal is in a connected state, send a physical downlink control channel command to the terminal, the physical downlink control channel command carries a non-competitive resource allocated by the base station to the terminal; and after receiving a random access initiated by the terminal using a random access prefix corresponding to the non-competing resource, send a random access response to the terminal, and the random access response carries indication information for simultaneously sending downlink data, and send the downlink data simultaneously.

An embodiment of the present application provides a computer-readable storage medium, which stores at least one program, where at least one processor is capable of executing the at least one program to implement:

in a case where a terminal is in a connected state, sending a physical downlink control channel command to the terminal, the physical downlink control channel command carries a non-competitive resource allocated by the base station to the terminal; and after receiving a random access initiated by the terminal using a random access prefix corresponding to the non-competing resource, sending a random access response to the terminal, and the random access response carries indication information for simultaneously sending downlink data, and sending the downlink data simultaneously.

Other aspects can be understood after the drawings and the detailed description are read and understood.

DETAILED DESCRIPTION

Figure 1:
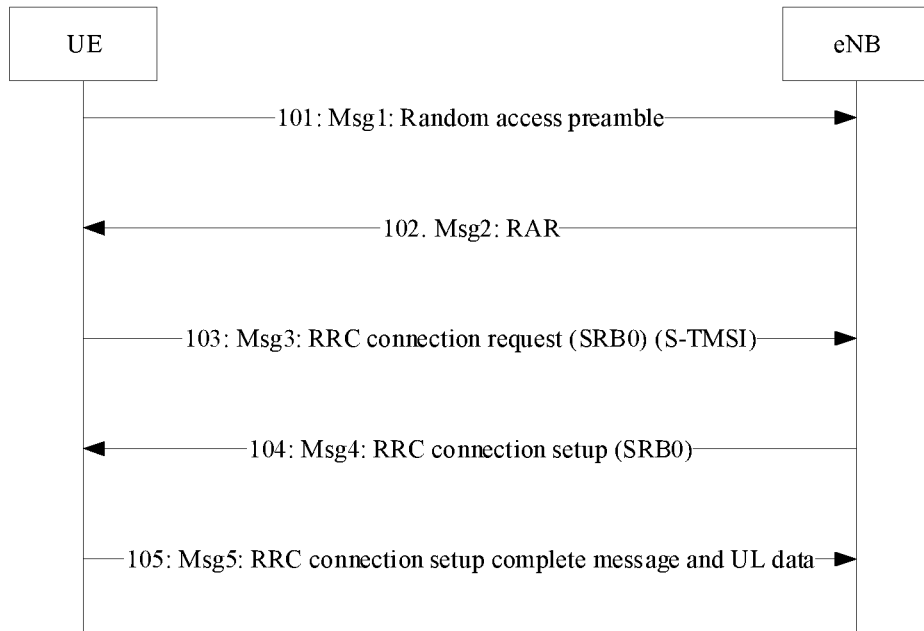
FIG. 1 is a flowchart of implementing a random access in the related art.

Embodiments of the present application will be described hereinafter in detail with reference to the drawings. The steps illustrated in the flowcharts in the drawings may be performed by a computer system such as a group of computers capable of executing instructions. Further, although logical sequences are illustrated in the flowcharts, the shown or described steps may be performed in sequences different from those described herein in some cases.

As shown in FIG. 1, it is that in the related art a UE in an RRC_IDLE state uses a CP scheme to upload data after a random access process, including steps 101 to 105.

In step 101, the UE sends an Msg1 message to an enhanced Node B (eNB), and carries a random access preamble.

In step 102, the eNB sends an Msg2 message to the UE, and carries a random access response (RAR).

In step 103, the UE sends an Msg3 message to the eNB, and carries an RRC connection request and an SAE-Temporary Mobile Subscriber Identity (S-TMSI).

In step 104, the eNB sends an Msg4 message to the UE, and carries an RRC connection setup message.

In step 105, the UE sends an Msg5 message to the eNB, and carries an RRC connection setup complete message and uplink data.

Figure 2:
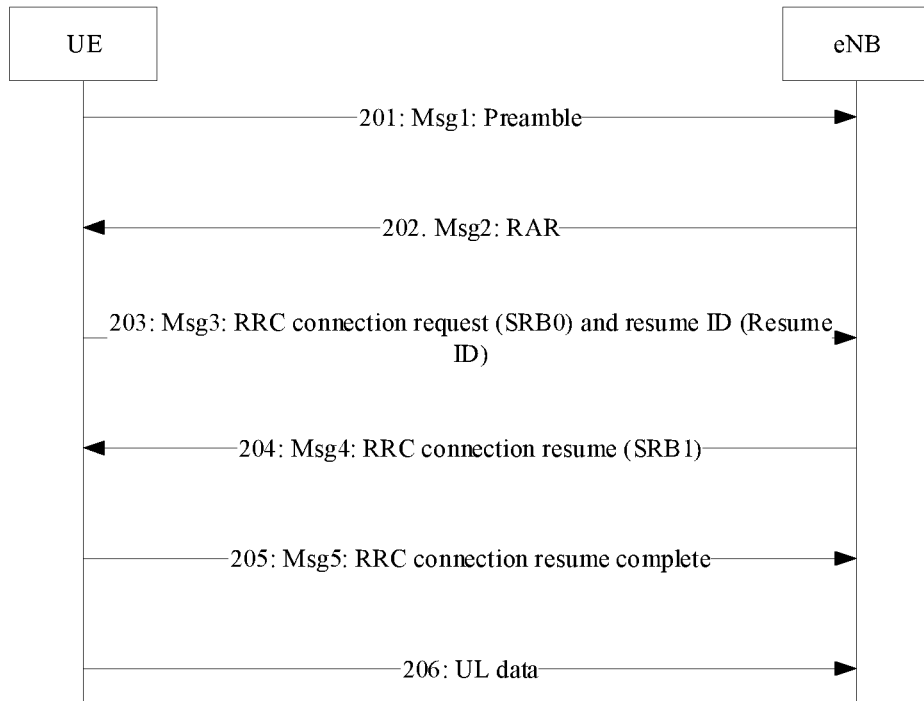
FIG. 2 is a flowchart of implementing another random access in the related art.

As shown in FIG. 2, it is that in the related art the UE in an RRC_IDLE state uses a UP scheme to upload data after the random access process, including steps 201 to 206.

In step 201, the UE sends the Msg1 message to the eNB and carries the random access preamble.

In step 202, the eNB sends the Msg2 message to the UE, and carries the random access response (RAR).

In step 203, the UE sends the Msg3 message to the eNB, and carries the RRC connection resume request and a resume ID. In step 204, the eNB sends the Msg4 message to the UE, and carries the RRC connection resume message. In step 205, the UE sends the Msg5 message to the eNB, and carries the RRC connection resume complete message. In step 206, the UE sends the uplink data to the eNB. In the related art, the terminal needs to set up or resume an RRC connection when sending the uplink data, and the terminal sends the uplink data to the base station only after the RRC connection is set up or resumed. In a large class of applications, such as a meter reading service, a static or low mobility UE each time may only need to send one data packet, and a time interval between two data packet sending is relatively long. In this case, the UE only sends one data packet after entering an RRC_CONNECTED state, but needs to maintain a period of time in the RRC_CONNECTED state to continuously monitor signals of the base station. After sending data once, the terminal returns to the RRC_IDLE state, or even returns to a power save mode (PSM), and reinitiates the RRC setup or resume request at the time of sending the data next time. The data transmission method in the related art causes unnecessary power consumption at the terminal. Therefore, embodiments of the present application provide a data transmission scheme to improve a situation in which energy consumption of uploading data by the terminal is relatively high in the related art.

Figure 3:
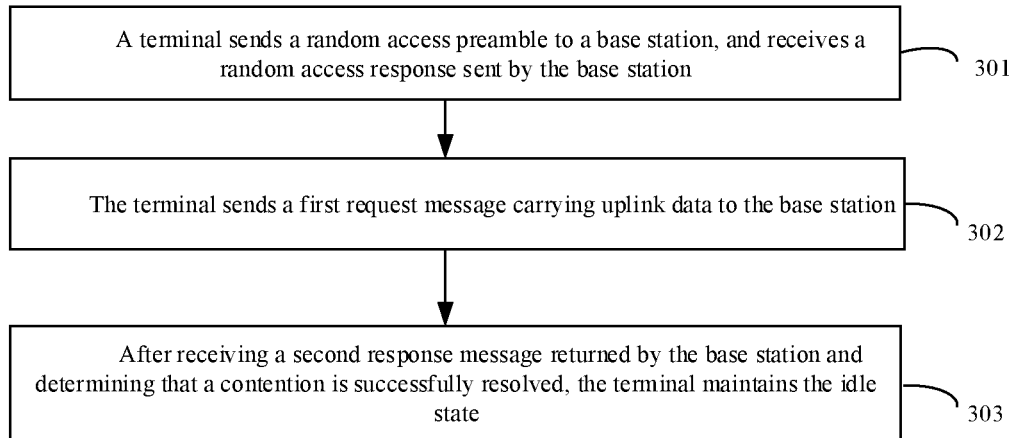
FIG. 3 is a flowchart of a data transmission method provided by an embodiment of the present application.

An embodiment of the present application provides a data transmission method. As shown in FIG. 3, steps 301 to 303 are included.

In step 301, a terminal sends a random access preamble to a base station, and receives a random access response sent by the base station.

In step 302, the terminal sends a first request message (Msg3) carrying uplink data to the base station. In a case where the terminal is in an idle state before sending the random access prefix, the method further includes the step 303, after receiving a second response message returned by the base station and determining that a contention is successfully resolved, maintaining, by the terminal, the idle state, taking a temporary-radio network temporary identity (T-RNTI) allocated by the base station carried in the random access response as a cell-radio network temporary identity (C-RNTI), and retaining the C-RNTI for a first length of time, where whether the contention is successfully resolved is determined by a contention resolution identification carried in the second response message. During data transmission, multiple terminals may send the same first request message to the base station, but the base station can only detect one, and the base station carries part of information in the first request message detected in the second response message. Only one terminal among multiple terminals determines that this second response message belongs to the terminal itself, the above process is a process of contention resolution.

In an embodiment, the second response message carries at least one of: a contention resolution identification; high-level acknowledgement information for the uplink data; an uplink data failure indication; an uplink data retransmission indication; or user service data.

The first request message further carries at least one or a combination of: indication information of whether to setup an S1 interface preferentially; indication information of whether to receive high-level acknowledgement information for the uplink data; information for identifying a mobility management entity (MME) at which the terminal registers; terminal identification information; access stratum security information; or a connection setup reason corresponding to data transmission.

In an embodiment, after the terminal receives the second response message returned by the base station and obtains the C-RNTI, the method further includes: detecting, by the terminal, in a public search space or a search space for transmitting scheduling information of the second response message, one of following information by using the C-RNTI: a physical downlink control channel (PDCCH), uplink scheduling information, or downlink scheduling information.

In an embodiment, after the terminal receives the second response message returned by the base station, the method further includes in response to determining that the terminal also needs to transmit the uplink data, the terminal needs to send the first request message carrying the uplink data to the base station.

Before sending the random access preamble to the base station, the terminal further selects the random access preamble or selects to send resources of the random access preamble.

In an embodiment, sending, by the terminal, the random access preamble to the base station includes: in response to determining that the terminal satisfies a first preset condition, sending, by the terminal, the random access preamble for requesting an uplink data transmission resource to the base station.

Sending, by the terminal, the random access preamble for requesting the uplink data transmission resource to the base station includes: selecting, by the terminal, a random access preamble from a random access preamble set for requesting the uplink data transmission resource, and sending the selected random access preamble to the base station; or selecting, by the terminal, a random access resource from a random access resource set for requesting the uplink data transmission resource, and sending the random access preamble by using the selected random access resource to the base station.

In an embodiment, the terminal satisfying the first preset condition includes at least one or a combination of: a size of uplink data to be sent by the terminal is greater than a data carrying determination threshold; a radio link condition of the terminal satisfies a link condition threshold; or a service type of the uplink data to be sent by the terminal belongs to a preset service type.

The physical downlink control channel may carry uplink scheduling information or downlink scheduling information.

In an embodiment, the method further includes: acquiring, by the terminal, from a system message sent by the base station, one or a combination of: a data carrying determination threshold; a link condition threshold; or preset service type information; where the data carrying determination threshold includes: a data carrying determination threshold configured for all coverage levels, or a data carrying determination threshold configured for each coverage level separately.

In an embodiment, the method further includes one of: failing to receive, by the terminal, a second response message returned by the base station; receiving, by the terminal, the second response message carrying an uplink data failure indication or an uplink data retransmission indication returned by the base station; and in response to determining that the terminal fails to receive the random access response returned by the base station, determining, by the terminal, a random access failure and reinitiating random access.

In an embodiment, reinitiating, by the terminal, the random access includes: determining, by the terminal, to select one of the random access preamble for requesting the uplink data transmission resource or the random access preamble not for requesting the uplink data transmission resource to perform the random access according to at least one of: a number of random access failures, a serial number of each random access failure; a downlink measurement obtained by the terminal; a coverage level; and a number of repetitions. The number of repetitions is configuration information obtained by the terminal, and a downlink measurement value is a reference signal received power value for example, and of course, may be other values.

In an embodiment, the terminal reinitiates the random access according to one of: at an current coverage level, in response to determining that a number of random access failures of the terminal by sending the random access preamble for requesting the uplink data transmission resource reaches a threshold value for the number of random access failures, changing, by the terminal, the coverage level to a maximum coverage level, and sending the random access preamble not for requesting the uplink data transmission resource to perform the random access or sending the random access preamble to perform the random access; at a current coverage level, in response to determining that a number of random access failures of the terminal by sending the random access preamble for requesting the uplink data transmission resource reaches a threshold value for the number of random access failures, sending, by the terminal, the random access preamble not for requesting the uplink data transmission resource to perform the random access or sending the random access preamble to perform the random access; in response to determining that the random access still fails and the number of random access failures reaches a threshold value for the number of random access failures, changing, by the terminal, the coverage level to a next coverage level higher than the current coverage level and performing the random access at the next coverage level in a random access manner same as that at the current coverage level until the random access succeeds; or changing, by the terminal, the coverage level to a maximum coverage level and performing the random access at the maximum coverage level in the random access manner same as that at the current coverage level; at a current coverage level, in response to determining that a number of random access failures of the terminal by carrying the uplink data in the first request message reaches a threshold value for the number of random access failures, changing, by the base station, the coverage level to a maximum coverage level, and sending the first request message carrying a radio resource control (RRC) message to perform the random access; at a current coverage level, in response to determining that a number of random access failures of the terminal by sending the uplink data carried in the first request message reaches a threshold value for the number of random access failures, sending, by the terminal, the first request message carrying an RRC message; in response to determining that the random access still fails and the number of failures reaches a threshold value for the number of random access failures, changing, by the terminal, the coverage level to a next coverage level higher than the current coverage level and performing the random access at the next coverage level in a random access manner same as that at the current coverage level until the random access succeeds, or changing, by the terminal, the coverage level to a maximum coverage level and performing the random access at the maximum coverage level in the random access manner same as that at the current coverage level; in response to determining that a number of random access failures of the terminal by sending the random access preamble for requesting the uplink data transmission resource reaches a threshold value for the number of random access failures, sending the random access preamble not for requesting the uplink data transmission resource to perform the random access; in response to determining that a number of random access failures of the terminal by sending the random access preamble for requesting the uplink data transmission resource reaches a threshold value for the number of random access failures and that a reference signal receiving power (RSRP) value measured by the terminal is in a first predefined range, sending, by the terminal, the random access preamble not for requesting the uplink data transmission resource to perform the random access; in response to determining that the number of random access failures of the terminal by sending the random access preamble for requesting the uplink data transmission resource sent by the terminal reaches the threshold value for the number of random access failures and that the RSRP value measured by the terminal is in a second predefined range, changing, by the terminal, the coverage level to a next coverage level, and sending the random access preamble not for requesting the uplink data transmission resource to perform the random access; or sending, by the terminal, the random access preamble not for requesting the uplink data transmission resource to perform the random access after the random access failure through sending the random access preamble for requesting the uplink data transmission resource, sending, by the terminal, the random access preamble for requesting the uplink data transmission resource to perform the random access after the random access failure through sending the random access preamble not for requesting the uplink data transmission resource, and repeating the former manner; in response to determining that a number of random access failures reaches a threshold value for the number of random access failures, changing, by the terminal, the coverage level to a next coverage level and performing the random access at the next coverage level in a random access manner same as that at the current coverage level until the random access succeeds, or changing, by the terminal, the coverage level to a maximum coverage level and performing the random access at the maximum coverage level in the random access manner same as that in the current coverage level.

In an embodiment, the method further includes: acquiring, by the terminal, the threshold value for the number of random access failures corresponding to each coverage level, by receiving the system message broadcast by the base station or a dedicated message sent by the base station to the terminal.

In an embodiment, before reinitiating the random access by the terminal, the method further includes: acquiring, by the terminal, operation indication information from the base station, and determining a manner for reinitiating the random access according to the operation indication information.

In an embodiment, before performing random access by the terminal, the method further includes: acquiring, by the terminal, operation indication information from the base station, and determining operations performed by the first request message carrying the uplink data after the random access failure according to the operation indication information.

In an embodiment, before reinitiating the random access by the terminal, determining whether to terminate or suspend a power raising operation according to at least one of: whether a format of the first request message for the random access is same as a format of the first request message for a previous random access; whether a manner of sending the random access preamble for the random access is same as a manner of sending the random access preamble for a previous random access, where the manner for sending the random access preamble includes: sending the random access preamble for requesting the uplink data transmission resource and sending the random access preamble not for requesting the uplink data transmission resource; or a reason for a previous random access failure.

In an embodiment, in a case where the terminal is in a connected state before sending the random access preamble, the first request message further carries one or a combination of: a C-RNTI, a RRC message, and a release request indication.

In an embodiment, in the case where the terminal is in the connected state before sending the random access preamble, the method further includes:

receiving, by the terminal, a second response message returned by the base station, and in response to determining that a contention is successfully resolved, autonomously releasing, by the terminal, an RRC connection and transiting to an idle state; or receiving, by the terminal, a second response message returned by the base station, and in response to determining that a contention is successfully resolved, processing, by the terminal, an RRC release message carried in the second response message and transit to an idle state.

In an embodiment, sending, by the terminal, the first request message carrying the uplink data to the base station includes: acquiring, by the terminal, indication information carried in the random access response, and in response to determining that a second preset condition is satisfied, sending, by the terminal, the first request message carrying the uplink data to the base station.

In an embodiment, the method further includes: acquiring, by the terminal, indication information carried in the random access response, and in response to determining that a third preset condition is satisfied, sending, by the terminal, the first request message carrying an RRC message to the base station.

In an embodiment, satisfying the second preset condition is that the indication information is data amount information of a data size with uplink grant and the data size with the uplink grant is greater than an uplink grant threshold, or that the indication information indicates to directly send the uplink data at the time of sending the first request message; and satisfying the third preset condition is that the indication information is the information of the data size with the uplink grant and the data size with the uplink grant is less than or equal to the uplink grant threshold, or that the indication information indicates to carry the RRC message at the time of sending the first request message.

In an embodiment, the uplink grant threshold is one of: an uplink grant threshold corresponding to a state of the terminal before sending the random access preamble; or an uplink grant threshold corresponding to a coverage level at which the terminal is located and the state of the terminal before sending the random access preamble.

In an embodiment, an uplink grant threshold corresponding to the terminal in a connected state is greater than an uplink grant threshold corresponding to the terminal in an idle state.

In an embodiment, the method further includes: after receiving a second response message returned by the base station, setting up, restoring or re-setting up, by the terminal, an RRC connection according to an RRC response message carried in the second response message, and transiting, by the terminal, to the connection state.

Figure 4:
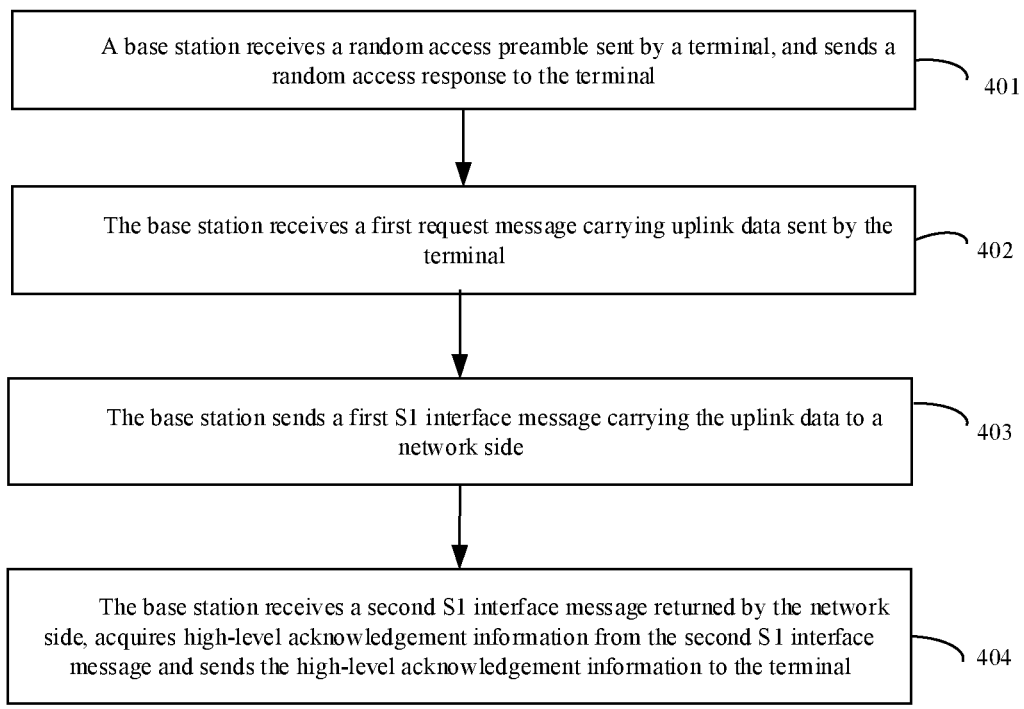
FIG. 4 is a flowchart of a data transmission method provided by an embodiment of the present application.

An embodiment of the present application provides a data transmission method, as shown in FIG. 4, steps 401 to 404 are included.

In step 401, a base station receives a random access preamble sent by a terminal, and sends a random access response to the terminal.

In step 402, the base station receives a first request message carrying uplink data sent by the terminal.

In an embodiment, after the base station receives the first request message carrying the uplink data sent by the terminal, the method further includes sending, by the base station, a second response message to the terminal, where the second response message carries one or a combination of: a contention resolution identification; high-level acknowledgement information for the uplink data; an uplink data sending failure indication; an uplink data retransmission indication; or user service data.

In an embodiment, the first request message further carries at least one or a combination of: indication information of preferentially setting up an S1 interface; indication information of receiving high-level acknowledgement information for the uplink data; terminal identification information; information for identifying a mobility management entity (MME) at which the terminal registers; access stratum security information; or a connection setting up reason corresponding to data transmission.

In an embodiment, the method further includes steps 403 and 404.

In step 403, in response to determining that the first request message carries the indication information of preferentially setting up the S1 interface, sending, by the base station, a first S1 interface message carrying the uplink data to a network side; and In step 404, the base station receives a second S1 interface message returned by the network side, and in response to determining that the base station acquires the high-level acknowledgement information from the second S1 interface message, sends the high-level acknowledgement information to the terminal.

In an embodiment, the method further includes: in response to determining that the base station receives downlink data in the second S1 interface message, sending, by the base station, the downlink data to the terminal.

In an embodiment, the method further includes: sending, by the base station, operation indication information to the terminal through a system message or a dedicated message, where the operation indication information is used for indicating the terminal a manner for re-performing random access after a random access failure.

The manner for re-performing the random access includes one of: changing preferentially a coverage level and re-performing the random access; sending preferentially a random access preamble not for requesting an uplink data transmission resource or sending the random access preamble to re-perform the random access; and sending preferentially the first request message carrying the radio resource control (RRC) message to re-perform the random access.

In an embodiment, the method further includes: in a case where the terminal is in a connected state and the first request message further carries an RRC message, and after receiving, by the base station, the first request message carrying the uplink data sent by the terminal, sending, by the base station, a second response message to the terminal, where the second response message further carries an RRC reset-up message.

In an embodiment, the method further includes: in a case where the terminal is in a connected state and the first request message further carries a request release indication, and after receiving, by the base station, the first request message carrying the uplink data sent by the terminal, sending, by the base station, a second response message to the terminal, where the second response message further carries an RRC release message.

In an embodiment, the method further includes: sending, by the base station, a data carrying determination threshold to the terminal through a system message or a dedicated message; where the data carrying determination threshold is used by the terminal to determine to select the random access preamble sent to the base station from whether a random access preamble set not for requesting the uplink data transmission resource or a random access preamble set for requesting the uplink data transmission resource, or the data carrying determination threshold is used by the terminal to determine to select a random access resource for sending the random access preamble to the base station from whether a random access resource set for requesting the uplink data transmission resource or a random access resource set not for requesting the uplink data transmission resource; where the data carrying determination threshold includes: a data carrying threshold configured for all coverage levels, or a data carrying determination threshold configured for each coverage level separately.

In an embodiment, the random access response carries indication information for indicating a sending manner for the terminal to send the first request message; where receiving, by the base station, the first request message carrying uplink data sent by the terminal includes: in response to determining that a second preset condition is satisfied, receiving, by the base station, the first request message carrying the uplink data sent by the terminal; and in response to determining that a third preset condition is satisfied, receiving, by the base station, the first request message carrying an RRC message sent by the terminal.

In an embodiment, satisfying the second preset condition is that the indication information is data amount information of a data size with uplink grant and the data size with the uplink grant is greater than an uplink grant threshold, or that the indication information indicates to directly send the uplink data at the time of sending the first request message; and satisfying the third preset condition is that the indication information is the information of the data size with the uplink grant and the data size with the uplink grant is less than or equal to the uplink grant threshold, or that the indication information indicates to carry the RRC message at the time of sending the first request message.

In an embodiment, the uplink grant threshold is an uplink grant threshold corresponding to a state of the terminal before sending the random access preamble; or an uplink grant threshold corresponding to a coverage level at which the terminal is located and the state of the terminal before sending the random access preamble, that is, the same uplink grant threshold may be configured for multiple coverage levels, or different uplink grant thresholds may be configured for multiple coverage levels separately.

In an embodiment, an uplink grant threshold corresponding to the terminal in a connected state is greater than an uplink grant threshold corresponding to the terminal in an idle state.

In an embodiment, in a case where the terminal is in an idle state and after receiving, by the base station, the first request message carrying the uplink data sent by the terminal, sending, by the base station, a second response message to the terminal, where the second response message further carries an RRC response message.

An embodiment of the present application provides a data transmission method. The method includes sending a first request message to a base station in a random access process in a case where the terminal is in an idle state, receiving a second response message sent by the base station, and acquiring downlink data in the second response message.

An embodiment of the present application provides a data transmission method. The method includes in a process of performing a random access in a case where a terminal is in an idle state, receiving, by a base station, a first request message sent by the terminal, in response to determining that the base station has downlink data required to be sent to the terminal, carrying, by the base station, the downlink data at the time of sending the second response message to the terminal.

In an embodiment, before the terminal in the idle state initiates the random access, buffering the downlink data in response to determining that the base station receives the downlink data required to be sent to the terminal sent by a network side.

An embodiment of the present application provides a data transmission method. The method includes in a process of performing a random access in a case where a terminal is in an idle state, sending, by a network side, a second S1 interface message to a base station after receiving a first S1 interface message sent by the base station, where the second S1 interface message carries downlink data required to be sent to the terminal.

In an embodiment, the method further includes: before the terminal in the idle state initiates the random access, buffering the downlink data after the network side receives the downlink data required to be sent to the terminal sent by an application stratum.

An embodiment of the present application provides a data transmission method. The method includes in a case where a terminal is in a connected state, receiving, by the terminal, a physical downlink control channel command sent by a base station, acquiring an non-competitive resource allocated to the terminal by the base station from the physical downlink control channel command, initiating a random access by using a random access preamble corresponding to the non-competitive resource; and receiving, by the terminal, a random access response sent by the base station, and in response to determining that the random access response carries indication information for simultaneously sending downlink data, receiving, by the terminal, the downlink data An embodiment of the present application provides a data transmission method. The method includes in a case where a terminal is in a connected state, sending, by a base station, a physical downlink control channel command to the terminal, the physical downlink control channel command carries a non-competitive resource allocated by the base station to the terminal; and after receiving a random access initiated by the terminal using a random access preamble corresponding to the non-competing resource, sending, by the base station, a random access response to the terminal, and the random access response carries indication information for simultaneously sending downlink data, and sending the downlink data simultaneously.

The present application is further described by the following embodiments.

Embodiment One (a Basic Process of Sending Uplink Data in an Idle State, a Control Plane Scheme)

This embodiment provides an idle state uplink data transmission scheme without state transfer. When a UE is in an RRC_IDLE state, the UE sends a random access preamble for requesting a resource for sending uplink data. After receiving a random access response sent by the base station and obtains uplink grant, the UE sends the uplink data to the base station at the same time of sending a first request message. After the UE receives a second response message sent by the base station and determines that a contention is successfully resolved, the UE considers that the uplink data is sent successfully, and the UE maintains the RRC_IDLE state. At the same time, the UE may regard a media access control (MAC) stratum identity temporary-radio network temporary identity (T-RNTI) allocated by the base station as a formal MAC stratum identity cell-radio network temporary identify (C-RNTI), the UE in the RRC_IDLE state retains the C-RNTI for a first length of time which may be preset or configured by a network side for the UE.

Figure 5:
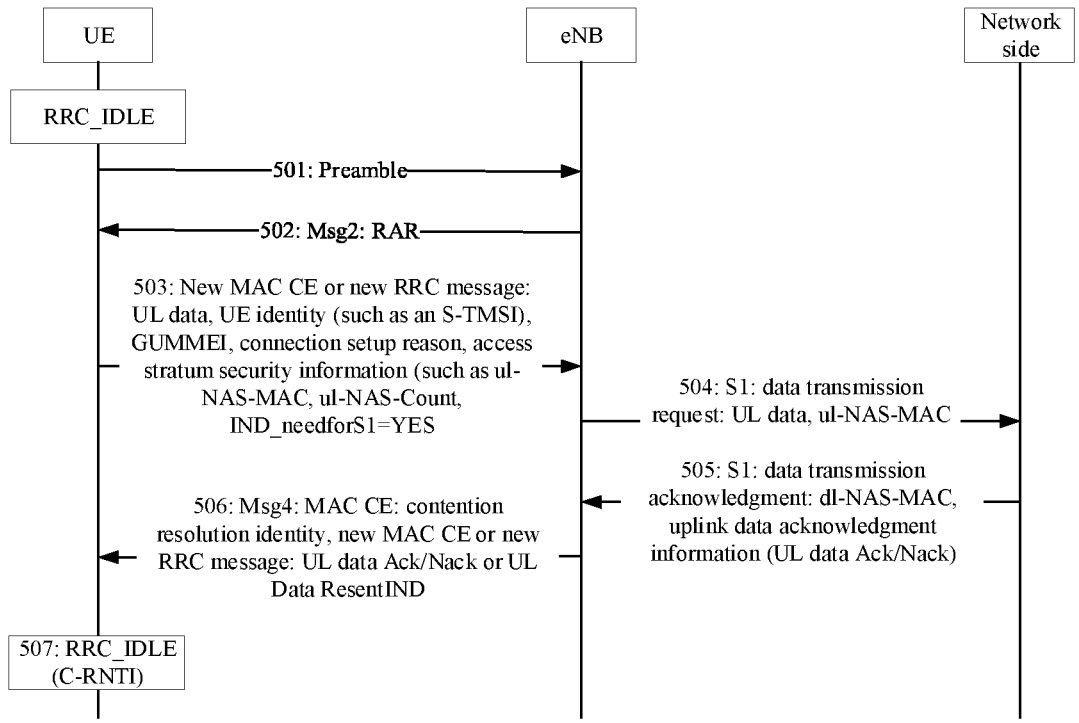
FIG. 5 is a flowchart of a data transmission method provided by embodiment one of the present application.

In this embodiment, the UE in the RRC_IDLE state uses a control plane (CP) scheme, as shown in FIG. 5, which includes steps 501 to 507.

In step 501, when the UE is in the RRC_IDLE state, the UE sends a random access preamble to a base station in a random access process for requesting a resource for sending uplink data, i.e., requesting uplink data transmission resource.

In step 502, the base station sends a random access response to the UE.

The random access response carries a temporary MAC stratum identify T-RNTI allocated by the base station to the UE.

In step 503, after receiving the random access response and obtaining the uplink grant, the UE simultaneously sends uplink data to the base station at the time of sending the first request message (Msg3).

The Msg3 may only carry an identity (such as a data target address identify) containing a core network identify and the uplink data, without an RRC message. The difference from the related art is that the Msg3 in the related art needs to carry the RRC message, such as an RRC connection setup request message, an RRC connection resume request message, or a new RRC connection public request message, which is used for triggering to setup or resume an RRC connection. In this embodiment, no RRC message is carried.

If the UE does not store a UE context at the time of releasing the RRC connection last time (i.e., using the CP scheme), the UE should carry an identity allocated by the core network to the UE, such as an S-TMSI, or information, such as the data target address identify or globally unique mobility management entity identifier (GUMMEI) which is able to identify a mobility management entity (MME) attached to the UE to the base station at the time of sending an uplink data packet through the Msg3. The UE may also carry access stratum security information, such as ul-NAS-MAC or ul-NAS-Count, to the base station at the time of sending the uplink data packet, and the access stratum security information may be obtained according to non-access stratum (NAS) security information. The Msg3 may also carry a connection setup reason, such as representing a connection setup reason for uplink data transmission.

The UE may include indication information of whether to set up an S1 interface preferentially in the first request message (for example, if the UE considers that the uplink data needs a high-level acknowledgement. In this case, it may be considered that the uplink data sent by the UE does not need a radio link control (RLC) and hybrid automatic repeat request (HARQ) stratum acknowledgement, just needs to wait for the high-level acknowledgement. If the S1 interface needs to be set up preferentially, IND_needforS1=YES information may be carried, and this indication may also be used as indication information of whether the UE needs to receive the high-level acknowledgement information of the uplink data.

In step 504, the base station sends a first S1 interface message carrying the uplink data to a network side.

For example, the first S1 interface message is a data transmission request (Data Transmission Req).

In other embodiments, the first S1 interface message may also be an initial user equipment information message; a user equipment context resume request message; an uplink non-access stratum transport message; or a path switch request message; or the first S1 interface message may also be other newly defined S1 interface messages. The network side is, such as, a mobility management entity (MME) attached to the UE.

If the UE also carries the access stratum security information to the base station, the base station may also send the access stratum security information to the MME at the same time.

In step 505, the network side sends a second S1 interface message to the base station.

For example, the second S1 interface message is a data transmission acknowledgement (Data Transmission Ack).

Or the second S1 interface message may also be a connection setup indication message; a UE context resume response message; a downlink NAS transport message; a path switch request acknowledgement message; or the second S1 interface message may also be another newly defined S1 interface messages.

The second S1 interface message carries high-level acknowledgement information (acknowledgement/non-acknowledgement) of the uplink data, and may also include downlink access stratum security information.

In step 506, the base station sends a second response message (Msg4) to a terminal.

The second response message carries a contention resolution ID (such as carried by a MAC stratum control unit).

The second response message (Msg4) may only carry the contention resolution ID and not the RRC message.

The second response message carries the high-level acknowledgement information (Ack/Nack for UL data), or an uplink data retransmission indication (DataResendIND).

In step 507, after receiving the second response message sent by the base station and determining that the contention is successfully resolved according to the contention resolution ID, the UE considers that the uplink data is sent successfully this time and maintains the RRC_IDLE state.

In the related art, the base station first sends the second response message to the terminal, and then sends the first S1 interface message to the MME. The first S1 interface message usually triggers the base station and the MME to set up the S1 interface and UE context for the UE. Compared with the related art, in this embodiment, the first S1 interface message may be sent before the second response message according to the UE indication, and not trigger to set up the S1 interface and the UE context for the UE.

In the related art, the Msg4 needs to carry an RRC message, such as the RRC connection setup message, the RRC connection resume message, or a new RRC connection public response message to complete the RRC setup or resume process. In this application, the Msg4 may not need to carry the RRC message.

In an embodiment, if the UE carries the indication of setting up the S1 interface preferentially at the time of sending the uplink data packet, the UE and the base station need to use a prolonged contention resolution timer. The prolonged contention resolution timer may be statically configured or the base station broadcasts durations of multiple contention resolution timers in a system message. The UE and the base station select one of them to use according to corresponding indication.

In an embodiment, the UE may regard the temporary MAC stratum identify T-RNTI allocated by the base station as the formal MAC stratum identifier C-RNTI in step 502. When maintaining the RRC_IDLE state, the UE retains the C-RNTI for a period of time. The specific retention time may be preset or configured by the network side for the UE. During this time, the UE always uses the C-RNTI to demodulate a physical channel in a calling search space (CSS) of the random access response (RAR), or in a newly defined CSS dedicated for Msg3 data transmission.

In an embodiment, if the UE receives the second response message of the base station but determines contention resolution failure, or does not receive the second response message, the UE considers uplink data sending failure, and the UE re-initiates a random access process to transmit data.

In an embodiment, if the second S1 interface message does not include an acknowledgement for the uplink data, or indicates uplink data transmission failure, the base station may include an uplink data transmission failure indication or an uplink data retransmission indication in the second response message sent to the UE.

In an embodiment, if the UE receives the second response message of the base station, the UE determines that the contention is resolved successfully according to the contention resolution ID, and the temporary MAC stratum identify T-RNTI allocated by the UE base station is regarded as the formal MAC stratum identify C-RNTI, but the second response message includes the uplink data sending failure indication or the uplink data retransmission indication, the UE needs to re-initiate a random access process to transmit the data, and the Msg3 carries the C-RNTI.

Embodiment Two (a Basic Process of Sending Uplink Data in an Idle State, a User Plane Scheme)

Figure 6:
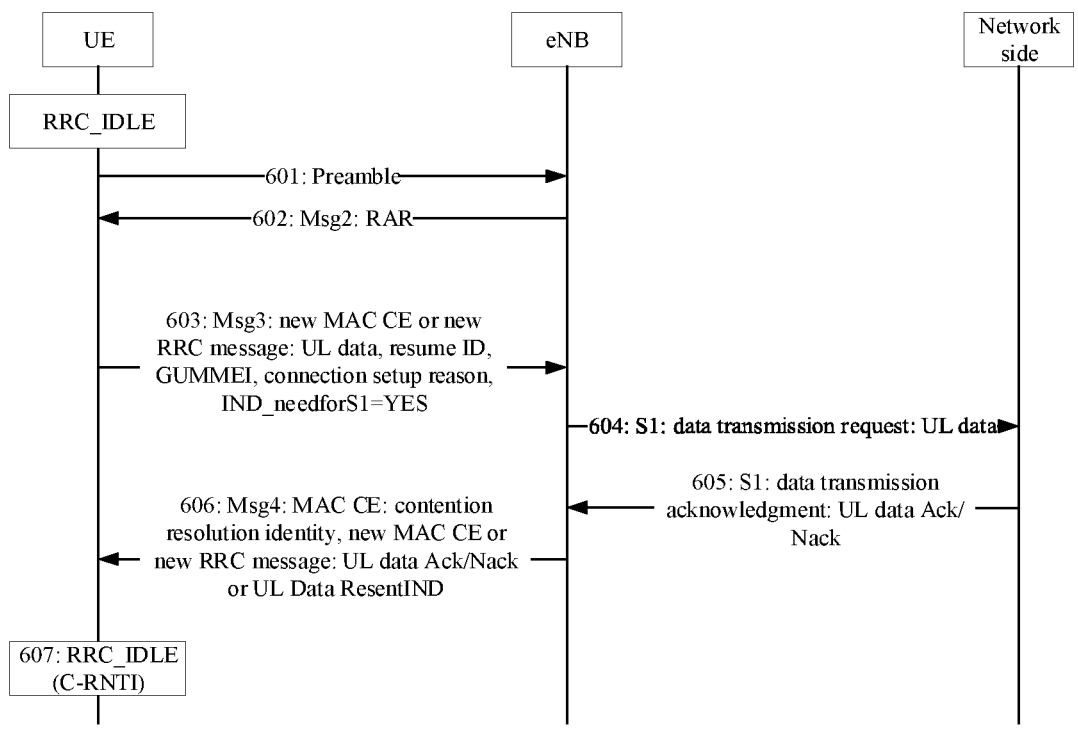
FIG. 6 is a flowchart of a data transmission method provided by embodiment two of the present application.

In this embodiment, the UE is in the RRC_IDLE state. Compared with the embodiment one, this embodiment adopts a user plane (UP) scheme. As shown in FIG. 6, steps 601 to 607 are included.

In step 601, when the UE is in the RRC_IDLE state, the UE sends a random access preamble to a base station in a random access process for requesting a resource for sending uplink data.

In step 602, the UE receives a random access response sent by the base station and obtains uplink grant.

In step 603, the UE sends uplink data to the base station at the time of sending a first request message (Msg3) at the same time.

This embodiment adopts the UP scheme. The UE performed a suspend operation at the time of releasing an RRC connection last time and stores a UE context and resume ID (ResumeID). The UE carries the resume ID at the same time of sending the uplink data through the Msg3.

The Msg3 may only carry an identity (such as a data target address identify or GUMMEI information) including a core network identify and the uplink data, without an RRC message. Compared with the related art, the Msg3 in the related art needs to carry the RRC message, such as an RRC connection setup request message, an RRC connection resume request message, or a new RRC connection public request message, which is used for triggering to setup or resume an RRC connection. In this embodiment, no RRC message is carried.

The UE may also carry access stratum security information to the base station at the time of sending an uplink data packet. The access stratum security information may be obtained according to NAS security information.

The UE may also carry a connection setup reason, such as representing a connection setup reason for uplink data transmission.

The UE may include indication information of whether to set up an S1 interface preferentially; (for example, if the UE considers that the uplink data needs a high-level acknowledgement, in this case, it may also considered that the uplink data sent by the UE does not need an RLC and HARQ stratum acknowledgement, just needs to wait for the high-level acknowledgement). If the S1 interface needs to be set up preferentially, IND_needforS1=YES information is carried. The indication may also be used as indication information of whether the UE needs to receive high-level acknowledgement information of the uplink data.

In step 604, the base station sends a first S1 interface message carrying the uplink data to a network side.

For example, the first S1 interface message is a data transmission request (Data Transmission Req).

The network side is, such as, a mobility management entity (MME) attached to the UE.

If the UE also carries the access stratum security information to the base station, the base station may also send the access stratum security information to the MME at the same time.

The base station finds the UE context stored on a base station side according to a resume identify, and sends the first S1 interface message to the MME according to MME information attached to the UE included in the UE context.

In step 605, the network side sends a second S1 interface message to the base station.

For example, the second S1 interface message is data transmission acknowledgement, carries high-level acknowledgement information (acknowledgement/non-acknowledgement) of the uplink data, and may also include downlink access stratum security information.

In step 606, the base station sends a second response message (Msg4) to a terminal.

The second response message carries a contention resolution identify, such as, carried by an MAC stratum control unit.

The second response message (Msg4) may only carry the contention resolution ID and not the RRC message.

In step 607, after receiving the second response message sent by the base station and determining that the contention is successfully resolved according to the contention resolution ID, the UE considers that the uplink data is sent successfully this time and maintains the RRC_IDLE state.

Embodiment Three (Continuous Data Transmission in an Idle State)

A UE may not be able to transmit all data to be transmitted during an initial random access process, in the RRC_IDLE state and a state having a C-RNTI, the UE may continue to send the first request message carrying the uplink data to a base station, and the base station sends a second response message to the UE and carries an acknowledgement for the uplink data at the same time. This process may be interacted several times until transmission of the data to be transmitted is completed.

Figure 7:
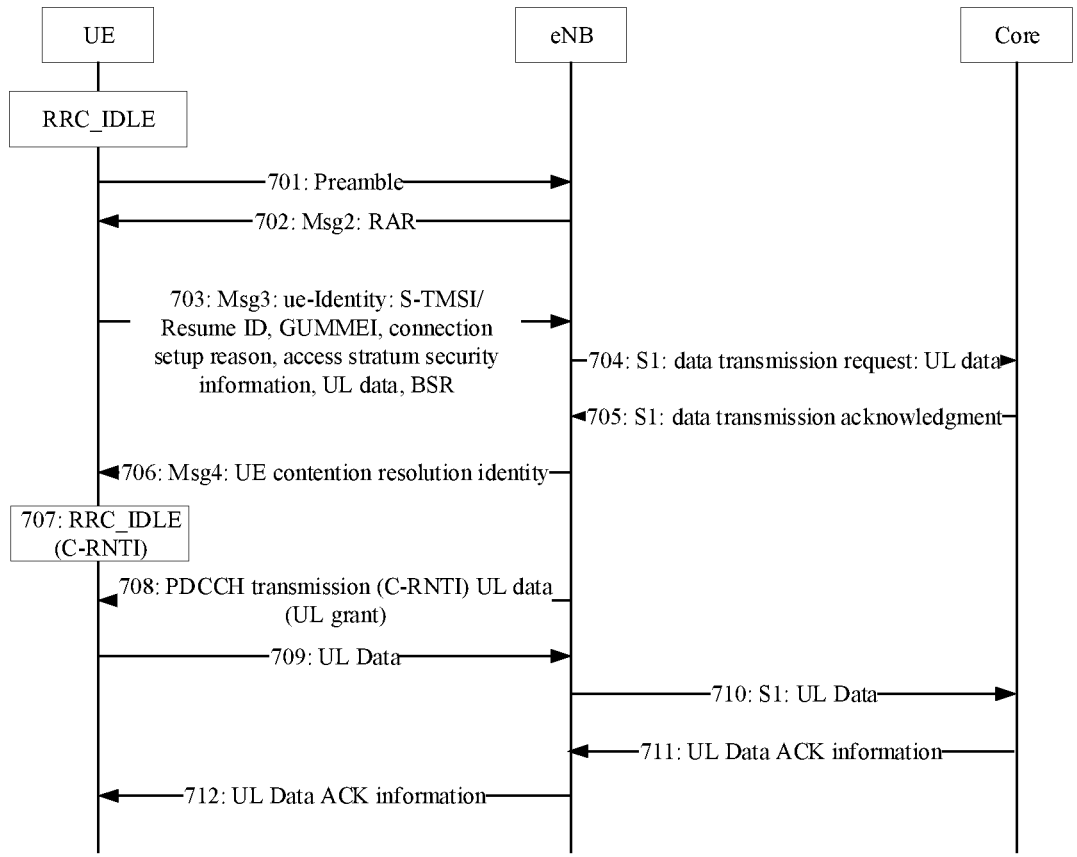
FIG. 7 is a flowchart of a data transmission method provided by embodiment three of the present application.

As shown in FIG. 7, steps 701 to 712 are included.

Steps 701 to 707 are the same as the steps 501 to 507, where the step 703 may also carry a buffer area status report, indicating that there is data to be sent.

In step 708, the base station allocates new uplink grant to a terminal through a physical downlink control channel (PDCCH) transmission, and the PDCCH transmission is scrambled with a cell-radio network temporary identify (C-RNTI).

In step 709, the terminal uses the C-RNTI to demodulate the PDCCH transmission, acquires the uplink grant, and sends the uplink data to the base station by using the uplink grant.

In step 710, the base station sends a first S1 interface message carrying the uplink data to a network side.

In step 711, the network side sends a second S1 interface message to the base station.

In step 712, if the second S1 interface message includes the acknowledgement for the uplink data, the base station sends the acknowledgement for the uplink data to the terminal.

Among them, steps 708 to 712 may be repeatedly performed several times until the transmission of all data to be transmitted of the terminal is completed.

Embodiment Four (Downlink Buffer Data is Sent in an Msg4, a CP Scheme and a UP Scheme are Combined)

If there is downlink data on a network side needed to be sent to an M2M, such as a narrow band Internet of Things (NB-IoT) or enhanced machine type communication (eMTC) user, and if these data is delay tolerance, and then the network side may buffer these downlink data for a period of time and then send it to the UE. During this period of time, if the network side receives the first S1 interface message, the network side may send the buffered downlink data to the base station in the second S1 interface message. If the base station has not sent a second response message to the UE yet after receiving the second S1 interface message, the base station may send downlink data included in the second response message to the UE, and the downlink data may be included in a newly defined media access control control element (MAC CE), or a newly defined data container information element (IE).

Figure 8:
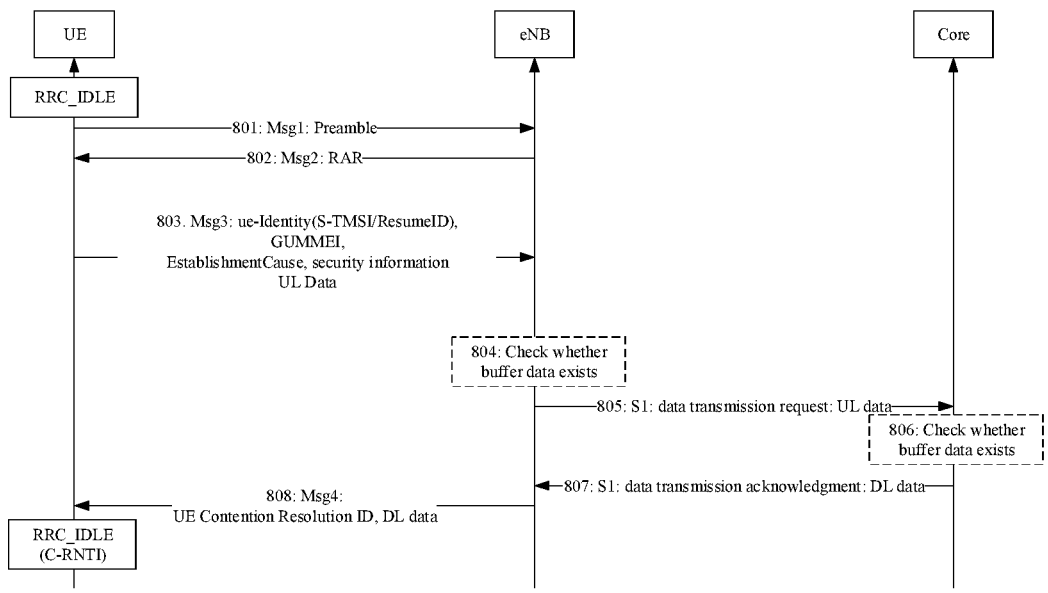
FIG. 8 is a flowchart of a data transmission method provided by embodiment four of the present application.

As shown in FIG. 8, it is a downlink data transmission process for a random access process, including steps 801 to 808.

In step 801, when the UE is in an RRC_IDLE state, the UE sends a random access preamble to the base station in a random access process for requesting a resource for sending uplink data.

In step 802, the UE receives a random access response sent by the base station and obtains uplink grant.

In step 803, the UE sends uplink data to the base station at the time of sending a first request message (Msg3) at the same time.

If the UE does not store a UE context at the time of releasing the RRC connection last time (i.e., using the CP scheme), the UE should carry an identity allocated by a core network to the UE, such as an S-TMSI, or information, such as a data target address identify or globally unique mobility management entity identifier (GUMMEI) which is able to identify an mobility management entity (MME) attached to the UE to the base station at the time of sending an uplink data packet through an Msg3. The UE may also carry access stratum security information to the base station at the time of sending an uplink data packet. The access stratum security information may be obtained according to NAS security information. Alternatively, the UE performed a suspend operation at the time of releasing an RRC connection last time and stores a UE context and resume ID (ResumeID). The UE carries the resume ID at the same time of sending the uplink data through the Msg3.

In step 804, the base station checks whether there is downlink data needed to be sent to a terminal, and if yes, the downlink data is included in the second response message.

In step 805, the base station sends a first S1 interface message carrying the uplink data to the network side.

For example, the first S1 interface message is a data transmission request (Data Transmission Req).

The network side is, such as, a mobility management entity (MME) attached to the UE.

If the UE also carries the access stratum security information to the base station, the base station may also send the access stratum security information to the MME at the same time.

In step 806, the network side checks whether there is downlink data needed to be sent to a terminal, and if yes, the downlink data is included in the second S1 interface message.

In step 807, the network side sends the second S1 interface message carrying the downlink data to the base station.

For example, the second S1 interface message is a data transmission acknowledgement (Data Transmission Ack).

For example, the second S1 interface message may also carry high-level acknowledgement information (acknowledgement/non-acknowledgement) of the uplink data, and may also include downlink access stratum security information.

In step 808, the base station sends the second response message (Msg4) carrying the downlink data to a terminal.

Other information carried in the second response message may refer to the step 506.

Embodiment Five (Downlink Data Buffer)

If a network side has downlink data to be sent to an M2M (NB-IoT or eMTC) user and the user is in an S1 interface idle state, and if these data is delay tolerance, then the network side may buffer these downlink data for a period of time without triggering to send an S1 interface paging message. Or if the network side has downlink data to be sent to the M2M (NB-IoT or eMTC) user and the user is in an S1 interface connected state, the network side sends the data to a base station. However, at this time, a terminal may be in an air interface idle state, so the base station may buffer these downlink data for a period of time without triggering to send an air interface paging message.

Figure 9:
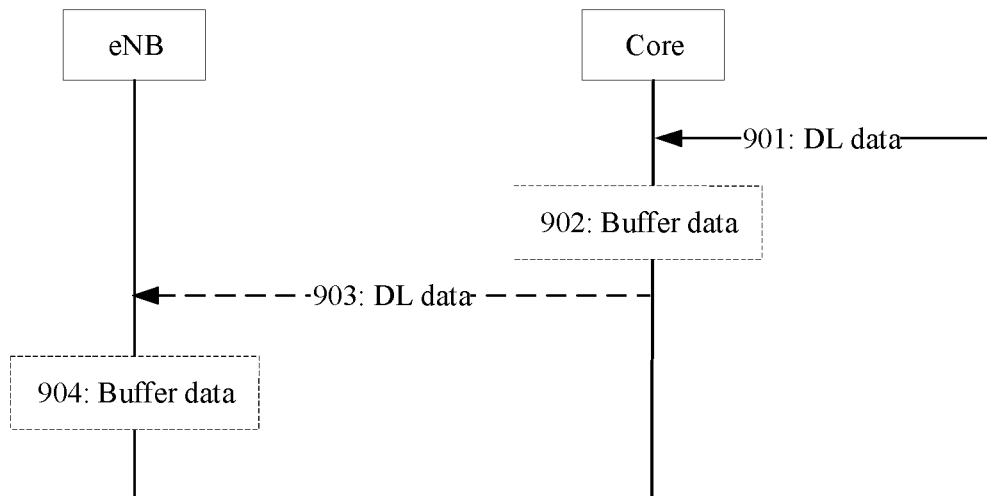
FIG. 9 is a flowchart of a data buffering method provided by embodiment four of the present application.

As shown in FIG. 9, it is a downlink data buffering flowchart, including steps 901 to 904.

In step 901, an application stratum sends downlink data to the network side.

In step 902, the network side determines that the user is in the S1 interface idle state and these downlink data is delay tolerance, then the network side may buffer the downlink data for a period of time without triggering to send the S1 interface paging message. A buffer duration may be a preset value.

In step 903, the network side determines that the user is in the S1 interface connected state, and sends the downlink data to the base station.

In step 904, the base station determines that the terminal is in the air interface idle state and these downlink data is delay tolerance, then the base station may buffer these downlink data for a period of time without triggering to send the air interface paging message. A buffer duration may be a preset value.

Figure 10:
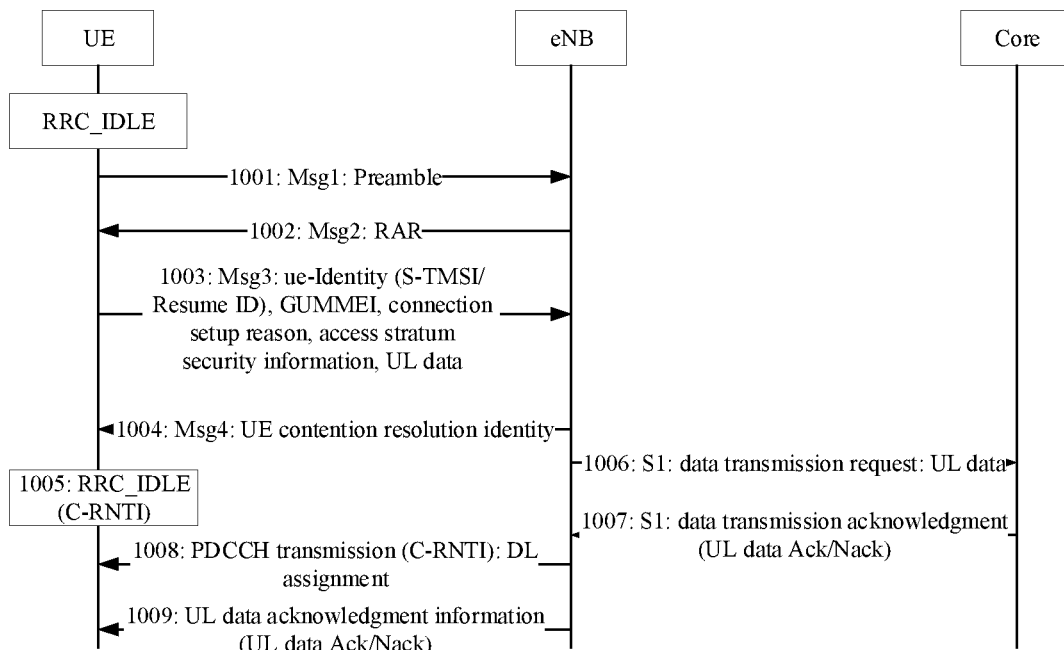
FIG. 10 is a flowchart of a data transmission method provided by an embodiment of the present application (sending a second response message first and then sending a first S1 interface message)

FIG. 10 is another implementation mode of the embodiment one or the embodiment two. This embodiment includes steps 1001 to 1009.

In step 1001, when the UE is in an RRC_IDLE state, the UE sends a random access preamble to a base station in a random access process for requesting a resource for sending uplink data.

In step 1002, the UE receives a random access response sent by the base station and obtains uplink grant.

In step 1003, the UE sends uplink data to the base station at the time of sending a first request message (Msg3) at the same time.

The Msg3 may carry a terminal identify, such as an S-TMSI or a resume identify, and may also carry an identity (such as GUMMEI information or a data target address identify) of a core network registered by the terminal and uplink data, without carrying an RRC message.

The UE may also carry access stratum security information to the base station at the time of sending an uplink data packet. The access stratum security information may be obtained according to NAS security information. The UE may also carry a connection setup reason.

In step 1004, the base station sends a second response message (Msg4) to a terminal.

The second response message carries a contention resolution identify, such as, carried by an MAC stratum control unit.

The second response message (Msg4) may only carry the contention resolution ID and not the RRC message.

In step 1005, after the UE receives the second response message sent by the base station and determines that the contention is resolved successfully according to the contention resolution ID, the UE maintains the RRC_IDLE state, and takes a temporary-radio network temporary identity (T-RNTI) allocated by the base station as a cell-radio network temporary identity (C-RNTI), and retains the C-RNTI for a first length of time.

In step 1006, the base station sends a first S1 interface message carrying the uplink data to a network side.

For example, the first S1 interface message is a data transmission request (Data Transmission Req).

In step 1007, the network side sends a second S1 interface message to the base station.

For example, the second S1 interface message is data transmission acknowledgement, carries high-level acknowledgement information (acknowledgement/non-acknowledgement) of the uplink data.

In step 1008, the base station sends downlink assignment information to the terminal through a PDCCH transmission, and the PDCCH transmission is scrambled with the C-RNTI.

In step 1009, the terminal uses the C-RNTI to demodulate the PDCCH transmission, acquires the downlink assignment information, and use the downlink assignment information to receive downlink data sent by the base station to the terminal. The downlink data may be high-level acknowledgement information of the uplink data.

Embodiment Six (a Terminal Determines an Msg3 Sending Manner According to Information in an RAR (with Data or an RRC Message, a CP Scheme and a UP Scheme are Combined)

When a UE is in an RRC_IDLE state, the UE sends a random access preamble for requesting a resource for sending uplink data in a random access process. The base station controls whether to setup or resume an RRC connection for the UE and whether to transfer the UE in an RRC_CONNECTED state.

The base station carries an indication in a random access response, which is used for indicating a sending manner of a first request message.

The indication may be an implicit indication, such as data amount information of a data size included in uplink grant, such as a transport block size (TB size) in a UL grant field in the RAR messages. When the indication (such as data amount information of the data size with the uplink grant) exceeds a certain threshold (hereinafter referred to as an uplink authorization threshold), the UE sends the uplink data directly to the base station at the time of sending the first request message. When the UE sends the first request message, the UE should encapsulate the uplink data according to the data amount information of the data size with the uplink grant and send the uplink data to the base station. If the UE's data to be sent exceeds the data amount information of the data size with the uplink grant, the UE may split the data to be sent according to the data amount information of the data size with the uplink grant into multiple fragments and sent in sequence. If the indication (such as the data amount information of the data size with the uplink grant) does not exceed an uplink grant threshold, the UE sends the first request message to the base station, and the first request message carries an RRC message, and the RRC message may be an RRC connection setup request or an RRC connection resume request message, or an RRC connection public request message.

Alternatively, the indication may be an explicit indication, indicating the UE to directly send the uplink data at the time of sending the first request message, or indicating the UE to initiate an ordinary RRC connection setup or resume process.

The uplink grant threshold may be a statically configured preset value or be configured by the base station. For example, the uplink grant threshold is sent to the UE through a newly defined field in a system message, and may be dynamically adjusted. For example, the uplink grant threshold is configured to be 200 bits. In an embodiment, the uplink grant threshold may be individually configured for each coverage level.

Or the base station may assign appropriate uplink grant to the terminal in the random access response according to a terminal request at the time of carrying another piece of indication information. The indication information indicates that if the UE fails to directly send the uplink data at the time of sending the first request message this time, the UE should use a random access preamble or a random access resource not requesting for sending the uplink data at the time of reinitiating the random access subsequently, i.e., the UE should initiate a random access for the ordinary RRC connection setup or resume process.

Figure 11:
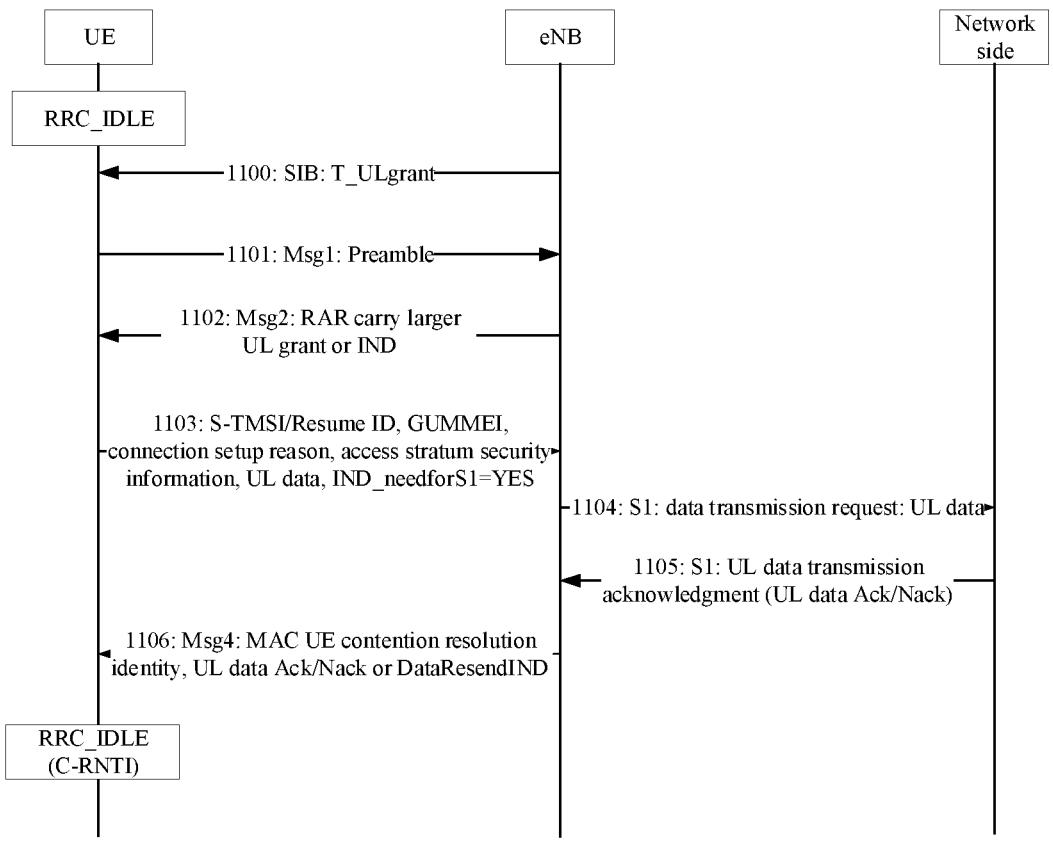
FIG. 11 is a flowchart of a data transmission method provided by embodiment six of the present application.

FIG. 11 is an implementation of directly sending the uplink data to the base station of the UE at the time of sending the first request message. As shown in FIG. 11, the UE is in an RRC_IDLE state, including steps 1100 to 1106.

In step 1100, the base station sends the uplink grant threshold (T_ULgrant) through the system message.

In step 1101, the UE sends a random access preamble to a base station in a random access process for requesting a resource for sending uplink data.

In step 1102, the base station sends the random access response to the UE, and carries larger uplink grant.

In step 1103, the UE determines that the data size with the uplink grant is greater than the uplink grant threshold, and the UE sends the uplink data to the base station at the time of sending the first request message (Msg3).

This embodiment adopts the UP scheme. The UE performed a suspend operation at the time of releasing an RRC connection last time and stores a UE context and resume ID (ResumeID). The UE carries the resume ID at the same time of sending the uplink data through the Msg3. If the CP scheme is adopted, the UE should carry an identity allocated to the UE by a core network, such as an S-TMSI, or information, such as GUMMEI information, which is able to identify an MME attached to the UE, to the base station.

In step 1104, the base station sends a first SI interface message carrying the uplink data to a network side.

In step 1105, the network side sends a second S1 interface message to the base station.

In step 1106, the base station sends a second response message (Msg4) to a terminal.

Figure 12:
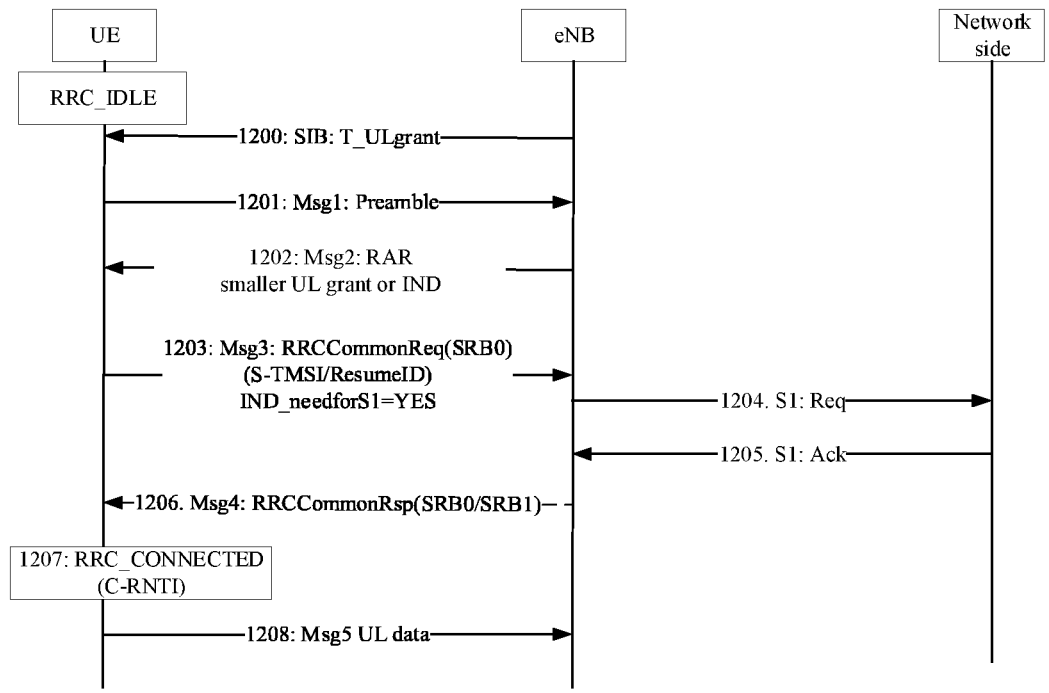
FIG. 12 is a flowchart of another data transmission method provided by embodiment six of the present application.

If the indication in the random access response (such as the data amount information of the data size with the uplink grant) does not exceed the uplink grant threshold, the UE sends the first request message to the base station, and the first request message carries the RRC message, and the UE should setup or resume the RRC connection after receiving the second response message carrying the RRC message, and transfer in the RRC_CONNECTED state, as shown in FIG. 12, including steps 1200 to 1208.

In step 1200, the base station sends the uplink grant threshold (T_ULgrant) through the system message.

In step 1201, the UE sends a random access preamble to a base station in a random access process for requesting a resource for sending uplink data.

In step 1202, the base station sends the random access response to the UE, carries data amount information of a small data size with the uplink grant (not exceeding the uplink grant threshold).

In step 1203, the UE determines that the data size with the uplink grant is less than or equal to the uplink grant threshold, and the UE sends the first request message (Msg3) to the base station, carries the RRC connection public request message; the public request message may be an existing RRC connection request message, the RRC connection resume request message, or the newly defined RRC connection public request message.

The Msg3 message also carries the identify allocated to the UE by the core network, such as the S-TMSI, or information which is able to identify the MME attached to the UE, to the base station or carry the resume ID.

In step 1204, the base station sends the first S1 interface message to the network side.

In step 1205, the network side sends a second S1 interface message to the base station.

In step 1206, the base station sends the second response message (Msg4) to the terminal, carries an RRC connection public response message. The public response message may be an existing RRC connection setup message, the RRC connection resume message, or the newly defined RRC connection public response message.

In step 1207, the UE sets up an RRC connection and enters the RRC_CONNECTED state.

In step 1208, the UE sends an Msg5 message to the base station, and carries the uplink data.

Embodiment seven (a terminal may process Msg4+RRC messages after sending Msg3+ data Even if a base station does not receive an RRC connection setup request or an RRC resume request message in a first request message, the base station may still actively send RRC to initiate an RRC connection setup or resume process, and transfer the terminal to an RRC_CONNECTED state, i.e., the base station sends a second response message carrying an RRC message to the UE. The RRC message may be an RRC connection setup, resume or public response message. When receiving the second response message, the UE should setup or resume an RRC connection and transfer to the RRC_CONNECTED state.

In the related art, generally the UE needs to send an RRC request message before receiving an RRC response message. The RRC request message may be an RRC connection setup request message, an RRC connection resume request message, or a new RRC connection public request message. The RRC response message may be the RRC connection setup message, the RRC connection resume message, or a new RRC connection public response message. In this embodiment, even if the UE has not sent the RRC request message, and may also process the RRC response message.

Figure 13:
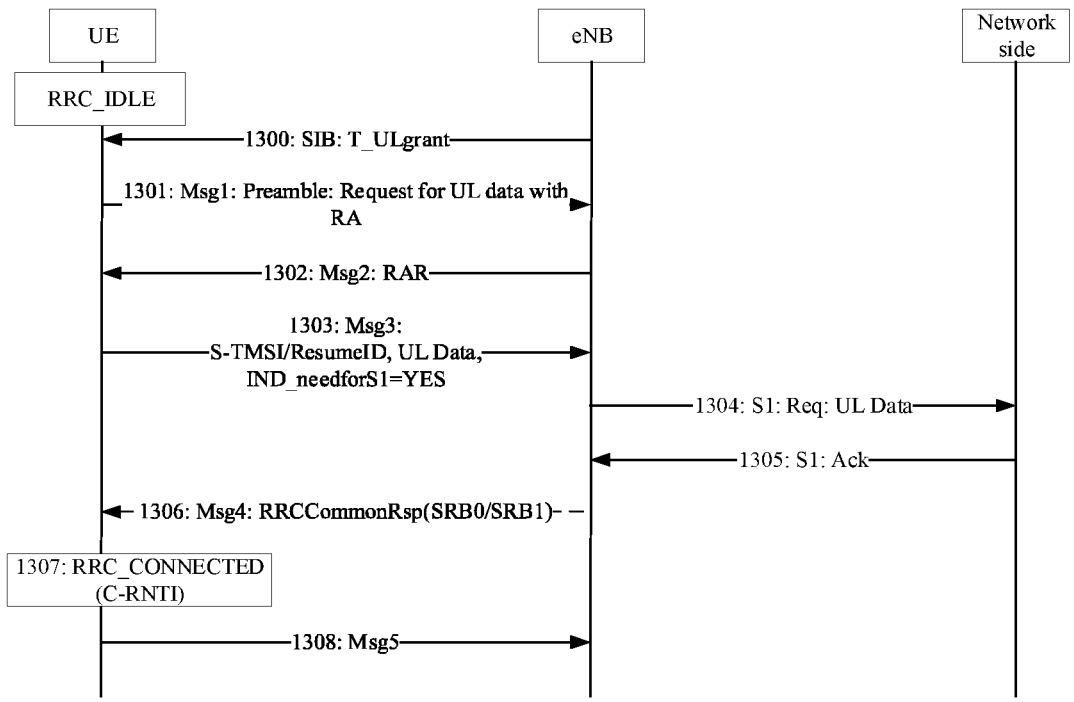
FIG. 13 is a flowchart of a data transmission method provided by embodiment seven of the present application.

As shown in FIG. 13, steps 1300 to 1308 are included.

In step 1300, the base station sends an uplink grant threshold (T_ULgrant) through a system message.

In step 1301, the UE sends a random access preamble to the base station in a random access process for requesting a resource for sending uplink data.

In step 1302, the base station sends a random access response to the UE.

In step 1003, the UE sends uplink data to the base station at the time of sending a first request message (Msg3) at the same time.

The UE should carry an identity allocated to the UE by a core network such as an S-TMSI, or information which is able to identify an MME attached to the UE, to the base station or carry a resume ID at the time of sending an uplink data packet through the Msg3.

In step 1304, the base station sends a first S1 interface message carrying the uplink data to a network side.

In step 1305, the network side sends a second S1 interface message to the base station.

In step 1306, the base station sends the second response message (Msg4) to the base station, carries an RRC connection public response message. The public response message may be an existing RRC connection setup message, the RRC connection resume message, or the newly defined RRC connection public response message.

In step 1307, the UE sets up an RRC connection and enters the RRC_CONNECTED state.

In step 1308, the UE sends an Msg5 to the base station.

Embodiment Eight

In a certain coverage level, if the UE fails to send uplink data (an Msg3 in a first format) for a certain number of times at the same time of sending a first request message, the UE preferentially changes the coverage level. When the coverage level reaches the maximum, the UE then turns to attempt to send the first request message carrying an RRC message to setup or resume an RRC connection (the Msg3 in a second format). Or at a certain coverage level, if the UE fails to send the uplink data (in the first format) at the same time of sending the first request message for a certain number of times, the UE preferentially changes to attempt to send the first request message carrying the RRC message to setup or resume the RRC connection (the Msg3 in the second format). If the UE still fails, the UE directly selects a next coverage level after a number of failures is reached according to a configured number of failures. At a new coverage level, the UE still performs a random access attempt in the above order.

The base station may broadcast operation indication information in a system message. If the UE is indicated to change the coverage level preferentially, the UE may be indicated a number of attempts of using the Msg3 in the second format at the maximum coverage level, or be indicated whether the number of attempts is the same as the number of attempts of using the Msg3 in the second format. If the UE is indicated to change to attempt the Msg3 in another format preferentially, the UE may be indicated the number of attempts of using the Msg3 in each format at the current coverage level, or be indicated a proportion of the number of attempts of using the Msg3 in each format in a total number of attempts.

At a certain coverage level, if there is a power raising operation, the UE may terminate or suspend the power raising operation in advance each time a random access is performed. For example, the UE first determines whether an Msg3 format used this time is the same as that used in the last time, and determines whether to terminate or suspend the power raising operation in advance according to the determination result. An example of adjusting the power raising operation is as follows.

If the different Msg3 format is used from the last time, no power is raised, or if the different Msg3 format is used from the last time, and the last time uses the Msg3 in the first format, and this time uses the Msg3 in the second format, no power is raised. That is, the power raising process is suspended or terminated in advance.

Or, the UE determines whether to terminate or suspend the power raising operation in advance according to a reason for an access attempt failure last time. Another example of adjusting the power raising operation is as follows.

After the UE fails to attempt the Msg3 in the first format, the UE determines whether to terminate or suspend the power raising process in advance according to the failure reason. If a certain type of failure reason occurs (such as a contention resolution failure), the UE does not increase an uplink transmit power but simply attempts again.

When the UE is in an RRC_IDLE state, the UE sends a random access preamble for requesting a resource for sending uplink data in a random access process. After the UE obtains uplink grant, the UE directly sends the uplink data to the base station at the time of sending the first request message in the random access process.

When the UE sends the random access preamble selected in a random access preamble set P1 for requesting an uplink data transmission resource at the current coverage level, but because a second response message (the second response message should include larger UL grant so that the UE sends uplink data without state transfer at the same time of sending the first request message) sent by the base station, or the contention resolution fails in a subsequent process, this random access attempt fails, the UE needs to initiate random access process again. In this case, the UE needs to repeatedly send the random access preambles in P1. When the repeated sending reaches a certain number of times N1, the number of times N1 is a preset value corresponding to the current coverage level or configured by the network side for the UE, the UE starts to use the random access preamble in the random access preamble set P2 not for requesting the uplink data transmission resource. If after sending the random access preamble in P2, this random access attempt fails because the second response message (the second response message should include smaller UL grant so that the UE sends the first request message including the RRC message to setup or resume the RRC connection) sent by the base station or the contention resolution fails in the subsequent process, then the UE repeatedly sends the random access preambles in P2. When the repeated sending reaches a certain number of times N2, the number of times N2 is a preset value corresponding to the current coverage level or configured by the network side for the UE, and the UE skips to a next coverage level and repeats the process again.

When the terminal uses the random access preamble set P1 for the random access, if the random access attempt fails because no random access response is received, the UE marks a failure reason S1, and if the random access attempt fails due to the contention resolution failure in the subsequent process, the UE marks a failure reason S2. When the UE fails due to S1, and the terminal uses the random access preambles in P1 for the random access again, the uplink transmit power may be increased according to configuration parameters. However, when the UE fails due to S2, there may be multiple UEs attempting to send the uplink data at the time of sending the first request message, and the system is overloaded. In this case, if the transmit power is still increased during retransmission, the system contention may be intensified, so that in a next attempt, the UE does not increase the uplink transmit power but only attempts again.

Embodiment Nine (Parallel Uplink Data Transmission and RRC Connection Re-Setup Process)

When a UE is in an RRC_CONNECTED state, an RRC re-set up process may be triggered due to a reason such as RLF. When the RRC is re-setup, there may be uplink data to be transmitted or re-transmitted. In this case, the uplink data may be sent at the same time of re-setting up, i.e., performing parallel uplink data transmission and RRC connection re-set up process.

Figure 14:
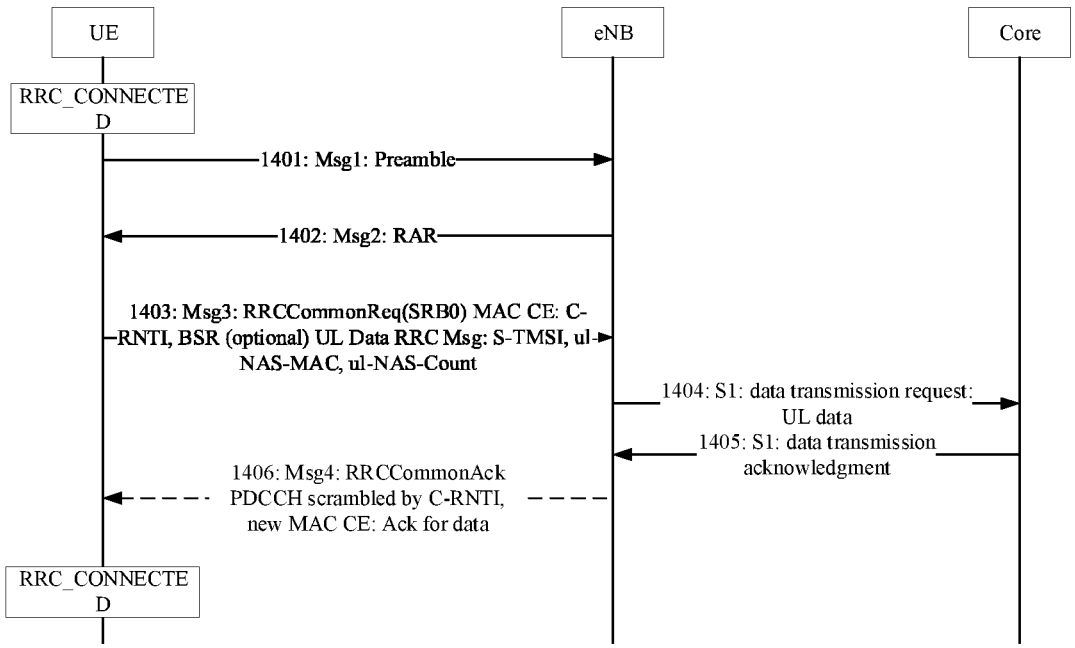
FIG. 14 is a flowchart of a data transmission method provided by embodiment nine of the present application.

As shown in FIG. 14, the UE is in the RRC_CONNECTED state and uses a CP scheme to transmit the uplink data in a random access process, including steps 1406 to 1406.

In step 1401, the UE sends a random access preamble to the base station in the random access process for requesting a resource for sending uplink data.

In step 1402, the base station sends a random access response to the UE.

In step 1403, the UE sends a first request message (Msg3) to the base station, carries an RRC connection public request message and uplink data; the RRC connection public request message may be an existing RRC connection re-set up request message, or a new RRC connection public request message.

The Msg3 also carries an identity allocated by a core network to the UE, such as an S-TMSI, or information, such as GUMMEI, which is able to identify a mobility management entity (MME) attached to the UE to the base station.

In step 1404, the base station sends a first SI interface message carrying the uplink data to a network side.

In step 1405, the network side sends a second S1 interface message to the base station.

In step 1406, the base station sends the second response message (Msg4) to the terminal, carries an RRC connection public response message. The RRC connection public response message may be the existing RRC connection re-set up message or the new RRC connection public response message.

Figure 15:
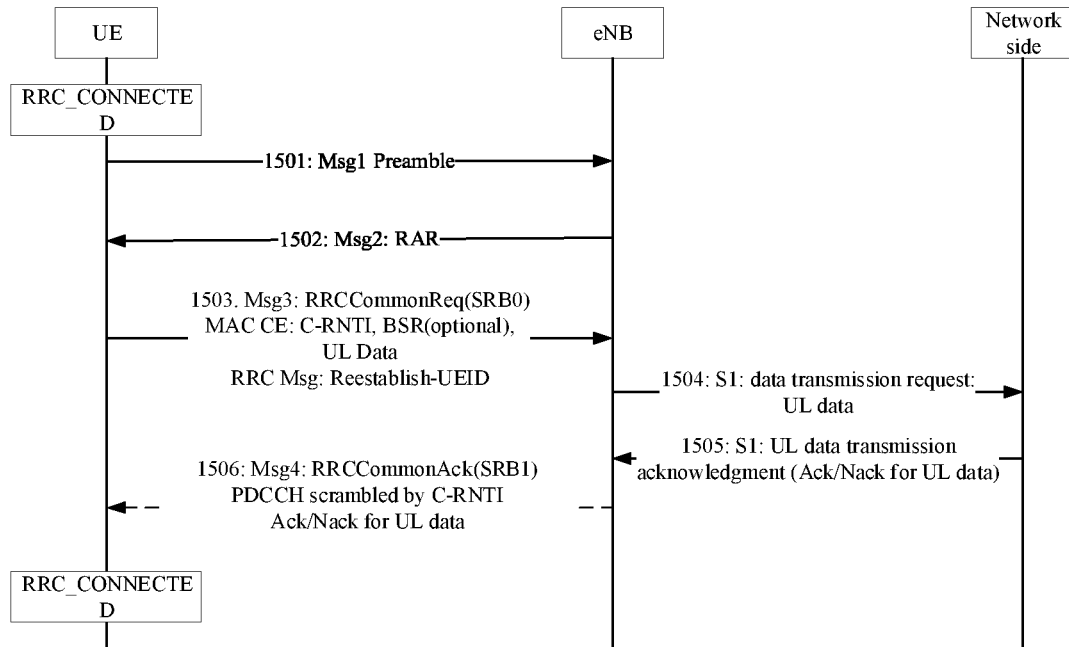
FIG. 15 is a flowchart of another data transmission method provided by embodiment nine of the present application.

As shown in FIG. 15, a UP scheme is used for transmitting the uplink data in the random access process, including steps 1501 to 1506.

In step 1501, the UE sends the random access preamble to the base station in the random access process for requesting a resource for sending uplink data.

In step 1502, the base station sends a random access response to the UE.

In step 1503, the UE sends a first request message (Msg3) to the base station, carries an RRC connection public request message and uplink data; the RRC connection public request message may be an existing RRC connection re-set up request message, or a new RRC connection public request message.

The Msg3 also carries a Reestablish-UE ID

In step 1504, the base station sends a first SI interface message carrying the uplink data to the network side.

In step 1505, the network side sends a second S1 interface message to the base station.

In step 1506, the base station sends the second response message (Msg4) to the terminal, carries an RRC connection public response message. The RRC connection public response message may be the existing RRC connection re-set up message or the new RRC connection public response message.

Embodiment Ten (Quick Release after Sending Uplink Data in a Connected State)

When a UE is in an RRC_CONNECTED state, there is data needed to be sent, and the UE is out of synchronization or has no uplink resources, the UE needs to initiate a random access process.

If the UE sends a random access preamble for requesting an resource for sending the uplink data, and the UE receives the random access response sent by the base station and obtains sufficient uplink grant, it may be considered that the UE and the base station negotiate to complete the data transmission as soon as possible and may initiate RRC connection quick release, the UE simultaneously sends the uplink data to the base station at the time of sending a first request message.

If the UE sends a random access preamble not for requesting the resource for sending the uplink data, or the UE does not obtain sufficient uplink grant from the base station, it may be considered that the UE sends an ordinary preamble, and then triggers a complete RRC connection setup process, and the data is transmitted after the connection setup is completed.

After the UE sends the first request message and the uplink data, if the UE receives a second response message sent by the base station and determines that the contention is successfully resolved, the UE autonomously releases to an RRC_IDLE state.

When sending the first request message and the uplink data, the UE may carry a release request indication, such as BSR=0, indicating that the base station may release. After receiving the first request message and the uplink data, the base station may trigger the quick release, and carry an RRC release message in the second response message sent by the base station to the UE, the release message is sent in a radio link control acknowledged mode (RLC AM). After receiving the second response message, the UE first determines that the contention is successfully resolved, then processes the RRC release message and sends an acknowledgement (ACK) to the message, and then the base station sends an RRC connection release message to the UE, and the UE is released to the RRC_IDLE state. If the contention resolution fails, the UE does not process the RRC message carried in the second response message. Compared with the related art, the RRC release messages in the related art may only be sent through an SRB1, and the RRC release messages in the present application may be sent through an SRB0.

The base station broadcasts different uplink grant thresholds for the idle state and the connected state through the system message. The connected state should have a stricter uplink grant threshold, i.e., the uplink grant threshold should ensure that when the UE initiates the random access to transmit the data in the connected state, All the data to be transmitted should be transmitted once as soon as possible and the connection should be released. The uplink grant threshold in the connected state is larger than the uplink grant threshold in the idle state.

Figure 16:
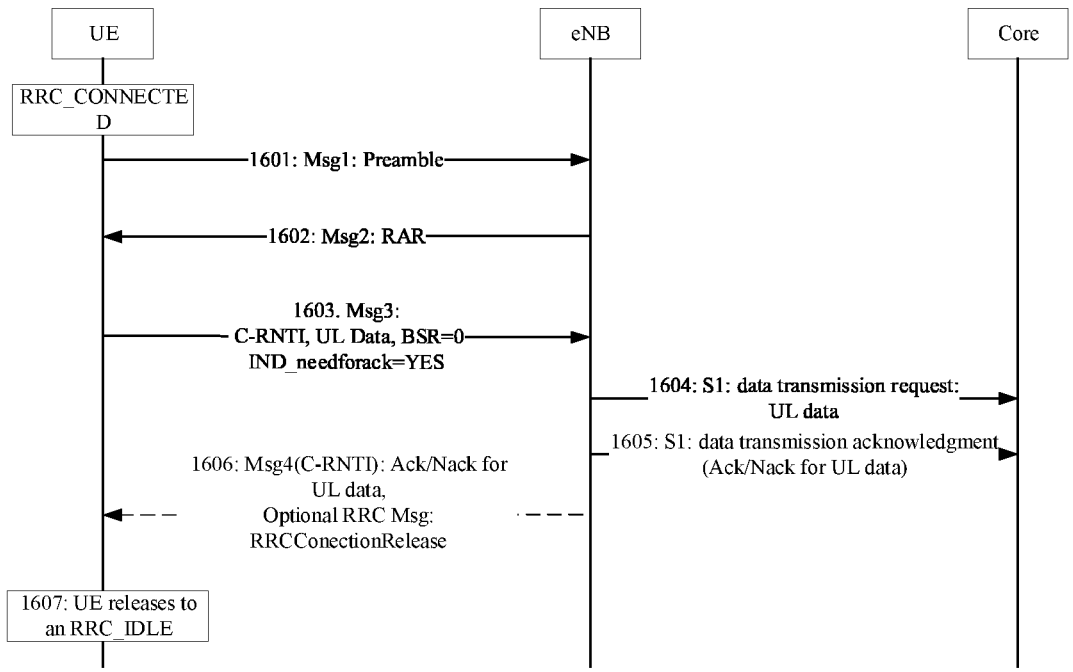
FIG. 16 is a flowchart of a data transmission method provided by embodiment ten of the present application.

As shown in FIG. 16, steps 1601 to 1607 are included.

In step 1601, the UE sends the random access preamble to the base station in the random access process for requesting resources for sending uplink data.

In step 1602, the base station sends a random access response to the UE.

In step 1603, the UE sends the first request message (Msg3) carrying the uplink data to the base station, and carries the release request indication, such as BSR=0.

The Msg3 also carries a C-RNTI.

In step 1604, the base station sends a first S1 interface message carrying the uplink data to the network side.

In step 1605, the network side sends a second S1 interface message to the base station.

In step 1606, the base station sends the second response message (Msg4) to the terminal, carries an RRC connection release message.

In step 1607, the UE first processes the Msg4, then processes the connection release message, and then the UE releases to the RRC_IDLE state.

Embodiment Eleven (Non-Competitive Access Msg2 Carries Downlink Data)

When a UE is in an RRC_CONNECTED state, if a network side has downlink data to send to the UE but finds that the UE is in a non-synchronization state, a base station needs to send a PDCCH order to the UE to trigger a random access process.

The PDCCH order includes an non-competitive resource allocated by the base station to the UE. When the UE initiates a random access using a random access preamble corresponding to the non-competitive resource, the base station finds information about the UE, and the base station sends a random access response to the UE. The random access response includes an indication that indicates to send the downlink data to the UE at the same time. The UE uses received downlink grant to receive the downlink data. After that, the UE may send a first request message to the base station, which includes a acknowledgment for the received downlink data. The UE needs to process tracking area (TA) information first, completes a synchronization process, and then processes a downlink data packet.

Figure 17:
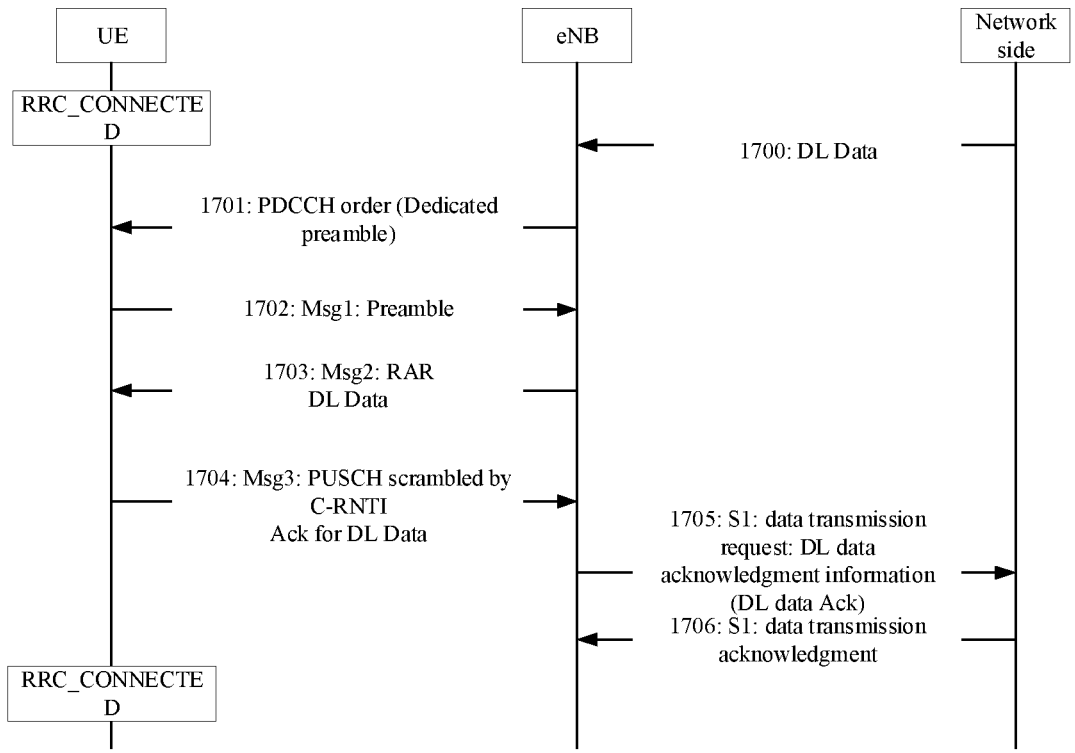
FIG. 17 is a flowchart of a data transmission method provided by embodiment eleven of the present application.

As shown in FIG. 17, the UE is in the RRC_CONNECTED state, including steps 1701 to 1706.

In step 1700, a network side sends the downlink data to the base station.

In step 1701, the base station sends a PDCCH order to the UE, carries the non-competitive resource allocated by the base station to the UE.

In step 1702, the UE sends the random access preamble corresponding to the non-competitive resource to the base station.

In step 1703, the base station sends a random access response to the UE, and simultaneously sends the downlink data, and the random access response carries indication information to indicate to simultaneously send the downlink data.

In step 1704, after receiving the random access response, and using the received downlink data, the UE sends the first request message (Msg3) to the base station, and carries acknowledgement information of the downlink data.

In step 1705, the base station sends a first S1 interface message to the network side, and carries acknowledgement information of the downlink data.

In step 1706, the network side sends a second S1 interface message to the base station.

Embodiment Twelve

When a UE is in an RRC_IDLE state, the UE sends a random access preamble for requesting a resource for sending uplink data in a random access process. The UE determines whether to request the resource for sending the uplink data in the following manner.

The base station configures a data carrying determination threshold T_ULdataRA for each coverage level. When the UL data to be transmitted buffered by the UE is greater than or equal to the data carrying determination threshold, the UE selects a random access preamble from the random access preamble set P1 for requesting the uplink data transmission resource. When the UL data to be transmitted buffered by the UE is less than the data carrying determination threshold, the UE selects a random access preamble from the random access preamble set P2 not for requesting the uplink data transmission resource.

P1 and P2 are divided in the following manners.

Manner 1: a resource not belonging to a PRACH resource configured for each coverage level is selected as P1.

For example, the base station configures at least one set of data transmission physical resource block (PRB) resources for an R15 UE. All PRBs which are different from physical random access channels/paging physical resource blocks (PRACHs/paging PRBs) configured for an R14 UE are taken as P1, in this case, all PRACHs/paging PRBs configured for the R14 UE may be regarded as P2. When multiple groups of data transmission PRB resources are configured, each group of data transmission PRB resources is used for indicating a certain uplink data size requirement. For example, three sets of data transmission PRB resources are configured, which are identified as a group A, a group B, and a group C respectively. Each set of data transmission PRB resources includes at least one PRB. When the UE selects any PRB in the group A, it indicates that the UE requests for sending uplink data with a size between [DataSizeMinGroupA, DataSizeMaxGroupA] when sending the first request message; each PRB may divide a PRACH time domain and a subcarrier resource for different coverage levels.

Figure 18:
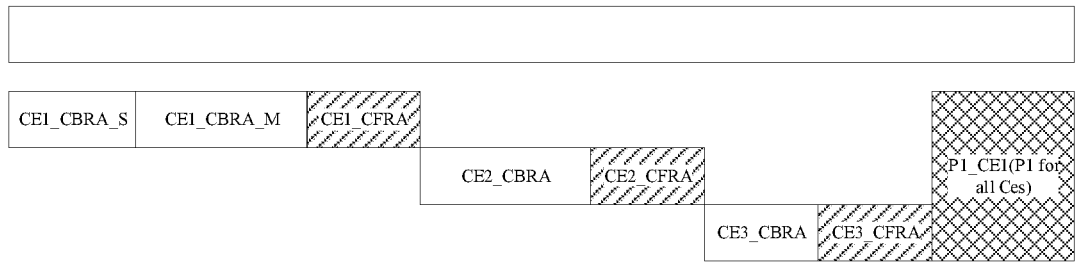
FIG. 18 is a schematic diagram of resource division provided by embodiment twelve of the present application.

The base station configures all subcarriers not configured for the R14 UE as P1 for the R15 UE, and the PRACH resource of each coverage level configured for the R15 UE no longer includes the subcarrier resource. At this time, the subcarrier configured for the R14 UE may be regarded as P2. The subcarrier in P1 may be divided into at least one group of data transmission subcarrier resources. Three groups of data transmission subcarrier resources are configured and identified as a group A, a group B, and a group C respectively. Each set of data transmission subcarrier resources includes at least one subcarrier. When the UE selects any subcarrier in the group A, it indicates that the UE requests for sending uplink data with a size between [DataSizeMin-GroupA, DataSizeMaxGroupA] when sending the first request message; when the R15 UE needs to select the PRACH resource corresponding to the coverage level at which the R15 UE is located after selecting the subcarrier. As shown in FIG. 18, CE1_CBRA_S identifies a non-competitive random access resource transmitting the Msg3 in a single-tone mode at a coverage level 1 in FIG. 18, CE1_CBRA_M identifies a non-competitive random access resource transmitting the Msg3 in a multi-tone mode at the coverage level 1 and CE1_CFRA identifies a non-competitive resource at the coverage level 1.CE2_CBRA identifies all competitive random access resources at a coverage level 2, and CE2_CFRA identifies non-competitive resources at the coverage level 2.CE3_CBRA identifies all competitive random access resources at a coverage level 3, and CE3_CFRA identifies non-competitive resources at the coverage level 3.

Manner 2: a certain resource belonging to the physical random access channel (PRACH) resource configured for each coverage level is selected as P1.

For example, the base station divides unused subcarrier resources in the non-competitive resource at each coverage level into at least one group of data transmission subcarrier resources.

Figure 19:
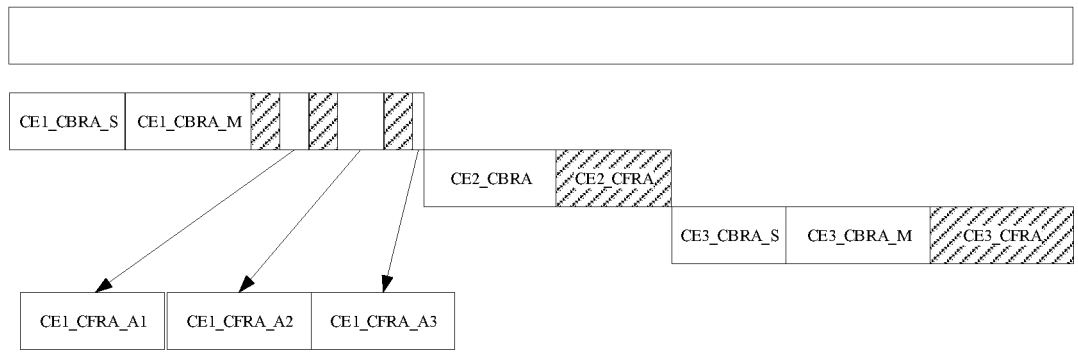
FIG. 19 is a schematic diagram of another resource division provided by embodiment twelve of the present application.

Although in the parameter configuration of R14, the non-competitive resources calculated by (nprach-NumSubcarriers−nprach-NumCBRA-StartSubcarriers) should be a period of continuous values, but according to R14 technologies, the UE and the terminal use a mod operation to ensure that the UE still uses subcarriers that the base station may be learned after changing the coverage level, so the actual used non-competitive subcarriers are discontinuous. Therefore, the base station may configure the unused subcarrier resources in the non-competitive resources at each coverage level as P1 CE1. As shown in FIG. 19, CE1_CBRA_S identifies the a competitive random access resource transmitting the Msg3 in the single-tone mode at the coverage level 1 in FIG. 19, CE1_CBRA_S identifies the competitive random access resource transmitting the Msg3 in the multi-tone mode at the coverage level 1 and CE1_CFRA identifies the non-competitive resource at the coverage level 1.CE1_CFRA_A1 CE1_CFRA_A3 respectively identify resources which have not been configured for the existing terminals in the non-competitive resource at the coverage level 1, and may be configured to be the random access resource for requesting the uplink data transmission resource used for the coverage level 1. CE2_CBRA identifies all competitive resources of the coverage level 2.CE2_CBRA identifies all non-competitive resources of the coverage level 2. CE3_CBRA_S identifies the a competitive random access resource transmitting the Msg3 in the single-tone mode at the coverage level 3, CE3_CBRA_M identifies the competitive random access resource transmitting the Msg3 in the multi-tone mode at the coverage level 3 and CE3_CFRA identifies the non-competitive resource at the coverage level 3. P1 for all CEs (P1 CE1) identifies resources which have not been configured for the existing terminals in all subcarrier resources, and may be configured to be the random access resource for requesting the uplink data transmission resource used for all coverage levels. In an embodiment, a sum of the random access resources used for requesting the uplink data transmission resource at all coverage levels is: P1=P1 CE1+P1_CE2+P1_CE3.

Figure 20:
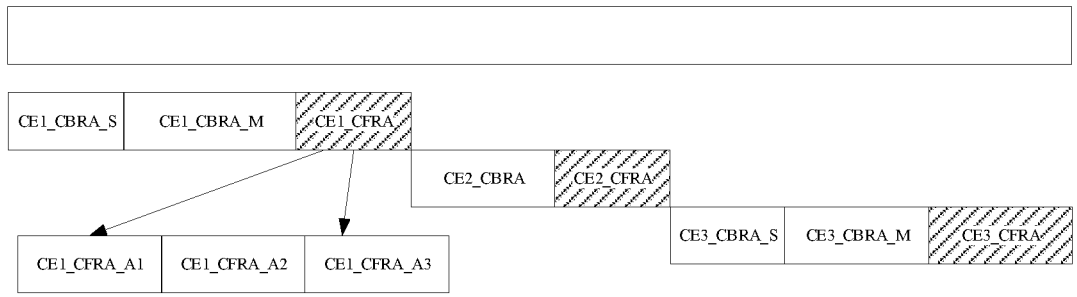
FIG. 20 is a schematic diagram of another resource division provided by embodiment twelve of the present application.

If there is no unused subcarrier resource in the non-competitive resource at each coverage level, the base station can configure the non-competitive resource at each coverage level as P1 for the R15 UE, provided that the base station is able to distinguish the random access initiated by the UE in the connected state and the idle state through the implementation mode. As shown in FIG. 20, CE1_CBRA_S identifies the a competitive random access resource transmitting the Msg3 in the single-tone mode at the coverage level 1 in FIG. 20, CE1_CBRA_M identifies the competitive random access resource transmitting the Msg3 in the multi-tone mode at the coverage level 1 and CE1_CFRA identifies the non-competitive resource at the coverage level 1.CE1_CFRA_A1~CE1_CFRA_A3 respectively identify part of the non-competitive resources at the coverage level 1. These resources have been configured for the existing terminals. If the base station may distinguish between existing terminals and new terminals, these resources may be allocated as the random access resources for requesting the uplink data transmission resource used for the coverage level 1.CE2_CBRA identifies all competitive random access resources at the coverage level 2.CE2_CBRA identifies all non-competitive resources of the coverage level 2. CE3_CBRA_S identifies the a competitive random access resource transmitting the Msg3 in the single-tone mode at the coverage level 3, CE3_CBRA_M identifies the competitive random access resource transmitting the Msg3 in the multi-tone mode at the coverage level 3 and CE3_CFRA identifies the non-competitive resource at the coverage level 3.

Figure 21:
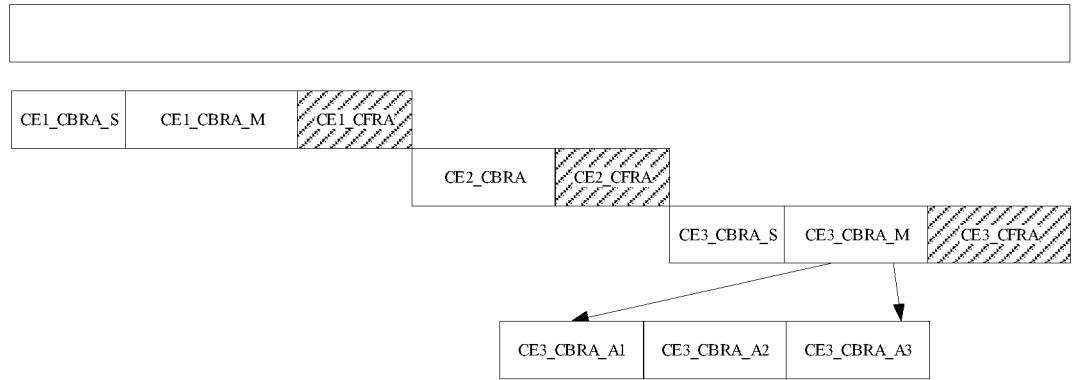
FIG. 21 is a schematic diagram of another resource division provided by embodiment twelve of the present application.

The base station divides subcarrier resources configured for the Multi-tone Msg3 in the competitive resource at each coverage level into at least one group of data transmission subcarrier resources. As shown in FIG. 21, CE1_CBRA_S identifies the a competitive random access resource transmitting the Msg3 in the single-tone mode at the coverage level 1 in FIG. 21, CE1_CBRA_M identifies the competitive random access resource transmitting the Msg3 in the multi-tone mode at the coverage level 1 and CE1_CFRA identifies the non-competitive resource at the coverage level 1. CE2_CBRA identifies all competitive random access resources at a coverage level 2, and CE2_CFRA identifies non-competitive resources at the coverage level 2. CE3_CBRA_S identifies the a competitive random access resource transmitting the Msg3 in the single-tone mode at the coverage level 3, CE3_CBRA_M identifies the competitive random access resource transmitting the Msg3 in the multi-tone mode at the coverage level 1.CE3_CFRA identifies all non-competitive resources of the coverage level 3.CE3_CBRA_A1~CE3_CBRA_A3 indicates that some resources are configured from CE3_CBRA_M to identify the random access resource for requesting the uplink data transmission resource used for the coverage level 3.

Only UEs that support multi-tone Msg3 transmission are allowed to send the uplink data at the time of sending the first request message.

An embodiment of the present application provides a data transmission apparatus. The apparatus includes a memory and a processor, where the memory stores a program and the data transmission method described in any one of the preceding embodiments is performed when the program is read and executed by the processor.

An embodiment of the present application provides a computer-readable storage medium storing at least one program. The at least one program is executable by at least one processor, to perform the data transmission method mentioned above.

The computer-readable storage medium includes a U disk, a Read-Only Memory (ROM), a Random Access Memory (RAM), a mobile hard disk, a magnetic disk, an optical disk or a plurality of media capable of storing program codes.

What is claimed is:

1. A data transmission method, comprising:
sending, by a terminal, a random access preamble to a base station, and receiving, by the terminal, a random access response sent by the base station; and
sending, by the terminal, a first request message carrying uplink data to the base station;
wherein the sending, by the terminal, the random access preamble to the base station comprises: in response to determining that the terminal satisfies a first preset condition, sending, by the terminal, the random access preamble for requesting an uplink data transmission resource to the base station;
wherein the method further comprising one of:
failing to receive, by the terminal, a second response message returned by the base station;
receiving, by the terminal, the second response message carrying an uplink data failure indication or an uplink data retransmission indication returned by the base station; or
in response to determining that the terminal fails to receive the random access response returned by the base station, determining, by the terminal, a random access failure and reinitiating, by the terminal, random access; and
wherein the reinitiating, by the terminal, the random access comprises:
determining, by the terminal, to select one of the random access preamble for requesting the uplink data transmission resource or the random access preamble not for requesting the uplink data transmission resource to perform the random access according to at least one of:
a number of random access failures, a serial number of each random access failure; a downlink measurement obtained by the terminal; a coverage level; or a number of repetitions.

2. The data transmission method of claim 1, further comprising: in a case where the terminal is in an idle state before sending the random access preamble,
after receiving the second response message returned by the base station and determining that a contention is successfully resolved, maintaining, by the terminal, the idle state, taking a temporary-radio network temporary identity (T-RNTI) allocated by the base station carried in the random access response as a cell-radio network temporary identity (C-RNTI), and retaining the C-RNTI for a first length of time.

3. The data transmission method of claim 2, further comprising: after the terminal receives the second response message returned by the base station and obtains the C-RNTI,
detecting, by the terminal, in a public search space or a search space for transmitting scheduling information of the second response message, one of following information by using the C-RNTI:
a physical downlink control channel (PDCCH), uplink scheduling information, or downlink scheduling information.

4. The data transmission method of claim 1, wherein the second response message further carries at least one of:
a contention resolution identification; high-level acknowledgement information for the uplink data; or user service data.

5. The data transmission method of claim 1, wherein the first request message further carries at least one or a combination of:
indication information of whether to set up an S1 interface preferentially; indication information of whether to receive high-level acknowledgement information for the uplink data; information for identifying a mobility management entity (MME) at which the terminal registers; terminal identification information; access stratum security information; or a connection setup reason corresponding to data transmission.

6. The data transmission method of claim 1, wherein sending, by the terminal, the random access preamble for requesting the uplink data transmission resource to the base station comprises:
selecting, by the terminal, the random access preamble from a random access preamble set for requesting the uplink data transmission resource, and sending the selected random access preamble to the base station; or
selecting, by the terminal, a random access resource from a random access resource set for requesting the uplink data transmission resource, and sending the random access preamble by using the selected random access resource to the base station.

7. The data transmission method of claim 1, wherein the terminal satisfying the first preset condition comprises at least one or a combination of:
a size of uplink data to be sent by the terminal is greater than a data carrying determination threshold;
a radio link condition of the terminal satisfies a link condition threshold; or
a service type of the uplink data to be sent by the terminal belongs to a preset service type.

8. The data transmission method of claim 1, wherein the method further comprises:
acquiring, by the terminal, from a system message sent by the base station, one or a combination of:
a data carrying determination threshold;
a link condition threshold; or
preset service type information;
wherein the data carrying determination threshold comprises: a data carrying determination threshold configured for all coverage levels, or a data carrying determination threshold configured for each coverage level separately.

9. The data transmission method of claim 1, wherein reinitiating, by the terminal, the random access according to one of:
at a current coverage level, in response to determining that a number of random access failures of the terminal by sending the random access preamble for requesting the uplink data transmission resource reaches a threshold value for the number of random access failures, changing, by the terminal, the coverage level to a maximum coverage level, and sending the random access preamble not for requesting the uplink data transmission resource to perform the random access or sending the random access preamble to perform the random access;
at a current coverage level, in response to determining that a number of random access failures of the terminal by sending the random access preamble for requesting the uplink data transmission resource reaches a threshold value for the number of random access failures, sending, by the terminal, the random access preamble not for requesting the uplink data transmission resource to perform the random access or sending the random access preamble to perform the random access; in response to determining that the random access still fails and the number of random access failures reaches a threshold value for the number of random access failures, changing, by the terminal, the coverage level to a next coverage level higher than the current coverage level and performing the random access at the next coverage level in a random access manner same as that at the current coverage level until the random access succeeds; or changing, by the terminal, the coverage level to a maximum coverage level and performing the random access at the maximum coverage level in the random access manner same as that at the current coverage level;

at a current coverage level, in response to determining that a number of random access failures of the terminal by carrying the uplink data in the first request message reaches a threshold value for the number of random access failures, changing, by the base station, the coverage level to a maximum coverage level, and sending the first request message carrying a radio resource control (RRC) message to perform the random access;

at a current coverage level, in response to determining that a number of random access failures of the terminal by sending the uplink data carried in the first request message reaches a threshold value for the number of random access failures, sending, by the terminal, the first request message carrying an RRC message; in response to determining that the random access still fails and the number of failures reaches a threshold value for the number of random access failures, changing, by the terminal, the coverage level to a next coverage level higher than the current coverage level and performing the random access at the next coverage level in a random access manner same as that at the current coverage level until the random access succeeds, or changing, by the terminal, the coverage level to a maximum coverage level and performing the random access at the maximum coverage level in the random access manner same as that at the current coverage level;

in response to determining that a number of random access failures of the terminal by sending the random access preamble for requesting the uplink data transmission resource reaches a threshold value for the number of random access failures, sending the random access preamble not for requesting the uplink data transmission resource to perform the random access;

in response to determining that a number of random access failures of the terminal by sending the random access preamble for requesting the uplink data transmission resource reaches a threshold value for the number of random access failures and that a reference signal receiving power (RSRP) value measured by the terminal is in a first predefined range, sending, by the terminal, the random access preamble not for requesting the uplink data transmission resource to perform the random access; in response to determining that the number of random access failures of the terminal by sending the random access preamble for requesting the uplink data transmission resource sent by the terminal reaches the threshold value for the number of random access failures and that the RSRP value measured by the terminal is in a second predefined range, changing, by the terminal, the coverage level to a next coverage level, and sending the random access preamble not for requesting the uplink data transmission resource to perform the random access; or sending, by the terminal, the random access preamble not for requesting the uplink data transmission resource to perform the random access after the random access failure through sending the random access preamble for requesting the uplink data transmission resource, sending, by the terminal, the random access preamble for requesting the uplink data transmission resource to perform the random access after the random access failure through sending the random access preamble not for requesting the uplink data transmission resource, and repeating the former manner; in response to determining that a number of random access failures reaches a threshold value for the number of random access failures, changing, by the terminal, the coverage level to a next coverage level and performing the random access at the next coverage level in a random access manner same as that at the current coverage level until the random access succeeds, or changing, by the terminal, the coverage level to a maximum coverage level and performing the random access at the maximum coverage level in the random access manner same as that in the current coverage level.

10. The data transmission method of claim 9, further comprising:
acquiring, by the terminal, the threshold value for the number of random access failures corresponding to each coverage level, by receiving the system message broadcast by the base station or a dedicated message sent by the base station to the terminal.

11. The data transmission method of claim 1, further comprising: before reinitiating the random access by the terminal,
acquiring, by the terminal, operation indication information from the base station, and determining a manner for reinitiating the random access according to the operation indication information.

12. The data transmission method of claim 1, further comprising: before performing random access by the terminal,
determining whether to terminate or suspend a power raising operation according to at least one of:
whether a format of the first request message for the random access is same as a format of the first request message for a previous random access;
whether a manner of sending the random access preamble for the random access is same as a manner of sending the random access preamble for a previous random access, wherein the manner for sending the random access preamble comprises: sending the random access preamble for requesting the uplink data transmission resource and sending the random access preamble not for requesting the uplink data transmission resource; or
a reason for a previous random access failure.

13. The data transmission method of claim 1, wherein in a case where the terminal is in a connected state before sending the random access preamble, the first request message further carries one or a combination of:
a C-RNTI, a RRC message, or a release request indication.

14. The data transmission method of claim 13, further comprising: in the case where the terminal is in the connected state before sending the random access preamble, receiving, by the terminal, the second response message returned by the base station, and in response to determining that a contention is successfully resolved, autonomously releasing, by the terminal, an RRC connection and transiting to an idle state; or receiving, by the terminal, the second response message returned by the base station, and in response to determining that a contention is successfully resolved, processing, by the terminal, an RRC release message carried in the second response message and transiting to an idle state.

15. The data transmission method of claim 1, wherein the sending, by the terminal, the first request message carrying uplink data to the base station comprises:

in a case where the terminal is in an idle state, sending the first request message to the base station in a random access processing, wherein the method further comprises: receiving the second response message sent by the base station, and acquiring downlink data in the second response message.

16. The data transmission method of claim 1, further comprising:

in a process of performing the random access in a case where the terminal is in an idle state, sending, by a network side, a second S1 interface message to the base station after receiving a first S1 interface message sent by the base station, wherein the second S1 interface message carries downlink data required to be sent to the terminal.

17. The method of claim 16, further comprising:

before the terminal in the idle state initiates the random access, buffering the downlink data after the network side receives the downlink data required to be sent to the terminal sent by an application stratum.

18. The data transmission method of claim 1, further comprising:

in a case where the terminal is in a connected state, receiving, by the terminal, a physical downlink control channel command sent by the base station, acquiring an non-competitive resource allocated to the terminal by the base station from the physical downlink control channel command, initiating the random access by using the random access preamble corresponding to the non-competitive resource; and in response to determining that the random access response carries indication information for simultaneously sending downlink data, receiving, by the terminal, the downlink data.

19. A non-transitory computer-readable storage medium storing at least one program, wherein the at least one program is executable by at least one processor to perform the data transmission method of claim 1.

20. A data transmission apparatus, applied to a terminal and comprising a memory and a processor, wherein the memory stores a program which, when read and executed by the processor, performs a data transmission method, wherein the data transmission method comprises:

sending a random access preamble to a base station, and receiving a random access response sent by the base station; and sending a first request message carrying uplink data to the base station;

wherein the sending the random access preamble to the base station comprises: in response to determining that the terminal satisfies a first preset condition, sending the random access preamble for requesting an uplink data transmission resource to the base station;

wherein the method further comprising one of:

failing to receive a second response message returned by the base station;

receiving the second response message carrying an uplink data failure indication or an uplink data retransmission indication returned by the base station; or in response to determining that the terminal fails to receive the random access response returned by the base station, determining a random access failure and reinitiating random access; and wherein the reinitiating the random access comprises:

determining to select one of the random access preamble for requesting the uplink data transmission resource or the random access preamble not for requesting the uplink data transmission resource to perform the random access according to at least one of:

a number of random access failures, a serial number of each random access failure; a downlink measurement obtained by the terminal; a coverage level; or a number of repetitions.

21. A data transmission method, comprising:

sending, by a terminal, a random access preamble to a base station, and receiving, by the terminal, a random access response sent by the base station; and sending, by the terminal, a first request message carrying uplink data to the base station;

wherein the sending, by the terminal, the random access preamble to the base station comprises: in response to determining that the terminal satisfies a first preset condition, sending, by the terminal, the random access preamble for requesting an uplink data transmission resource to the base station;

wherein in a case where the terminal is in a connected state before sending the random access preamble, the first request message further carries one or a combination of: a cell-radio network temporary identity (C-RNTI), a radio resource control (RRC) message, or a release request indication; and wherein in the case where the terminal is in the connected state before sending the random access preamble, the method further comprises:

receiving, by the terminal, a second response message returned by the base station, and in response to determining that a contention is successfully resolved, autonomously releasing, by the terminal, an RRC connection and transiting to an idle state; or receiving, by the terminal, a second response message returned by the base station, and in response to determining that a contention is successfully resolved, processing, by the terminal, an RRC release message carried in the second response message and transiting to the idle state.

* * * * *